United States Patent [19]

Gladish

[11] Patent Number: 5,668,421
[45] Date of Patent: Sep. 16, 1997

[54] PRESSURIZED AIR-GAP GUIDED ACTIVE LINEAR MOTOR SUSPENSION SYSTEM

[75] Inventor: Herbert E. Gladish, Ottawa, Canada

[73] Assignee: E. B. Eddy Forest Products Ltd., Ottawa, Canada

[21] Appl. No.: 417,948

[22] Filed: Apr. 6, 1995

[51] Int. Cl.$^6$ .......................... B60L 13/00; H02K 41/00; B65G 15/04
[52] U.S. Cl. ............................... 310/12; 104/23.2
[58] Field of Search ........................ 310/12; 104/23.2, 104/290, 291, 292, 294, 138.1

[56] References Cited

U.S. PATENT DOCUMENTS

| | | | |
|---|---|---|---|
| 3,547,041 | 12/1970 | Izhelya et al. | 310/12 X |
| 3,875,163 | 4/1975 | Zumin et al. | 544/377 |
| 3,952,666 | 4/1976 | Gladish | 104/134 X |
| 4,185,399 | 1/1980 | Gladish | 34/120 |
| 4,838,169 | 6/1989 | Gladish | 104/23.2 |
| 5,090,330 | 2/1992 | Gladish | 104/23.2 |
| 5,128,569 | 7/1992 | Gladish | 310/12 |

FOREIGN PATENT DOCUMENTS

| | | |
|---|---|---|
| 1280991 | 3/1991 | Canada. |
| 3402143 | 8/1984 | Germany. |
| 3536151 | 4/1986 | Germany. |
| 2165515 | 4/1986 | United Kingdom. |
| WO93/05565 | 3/1993 | WIPO. |

*Primary Examiner*—Steven L. Stephan
*Assistant Examiner*—Judson H. Jones
*Attorney, Agent, or Firm*—Jones, Tullar & Cooper, P.C.

[57] ABSTRACT

The invention relates to an active linear induction motor system that has particular advantage with a SAILRAIL® air guided and supported air bearing system. In this case the secondary for the motor is the support rail, which rail can have a convex or a concave operating surface, is electrically conductive, and has ferromagnetic material in close proximity to the operating surface. The primary for the motor is found in a runner which cooperates with the rail and supports the load to be carried in the system. The primary includes a plurality of laterally adjacent, longitudinally extending and articulated ferromagnetic laminations having a longitudinally toothed surface that is transversely arcuate to be complementary to the rail operating surface. Electrical windings are wound about selected groups of teeth of the laminations as a LIM primary. A compliant pad adjacent the laminations is capable of deformation under load and at least partial recovery after load removal. Electrical power is continuously provided to the primary as it moves along the rail and polyphase electrical current is fed to the electrical windings. Cooling fluid is continuously provided to the laminations during operation of the primary. The system also provides pressurized fluid at high velocity into the space between the rail operating surface and the compliant pad, to support the primary member above the operating surface and to provide a minute pressurized magnetic and suspension gap between the primary and secondary members for efficient linear motor operation.

31 Claims, 19 Drawing Sheets

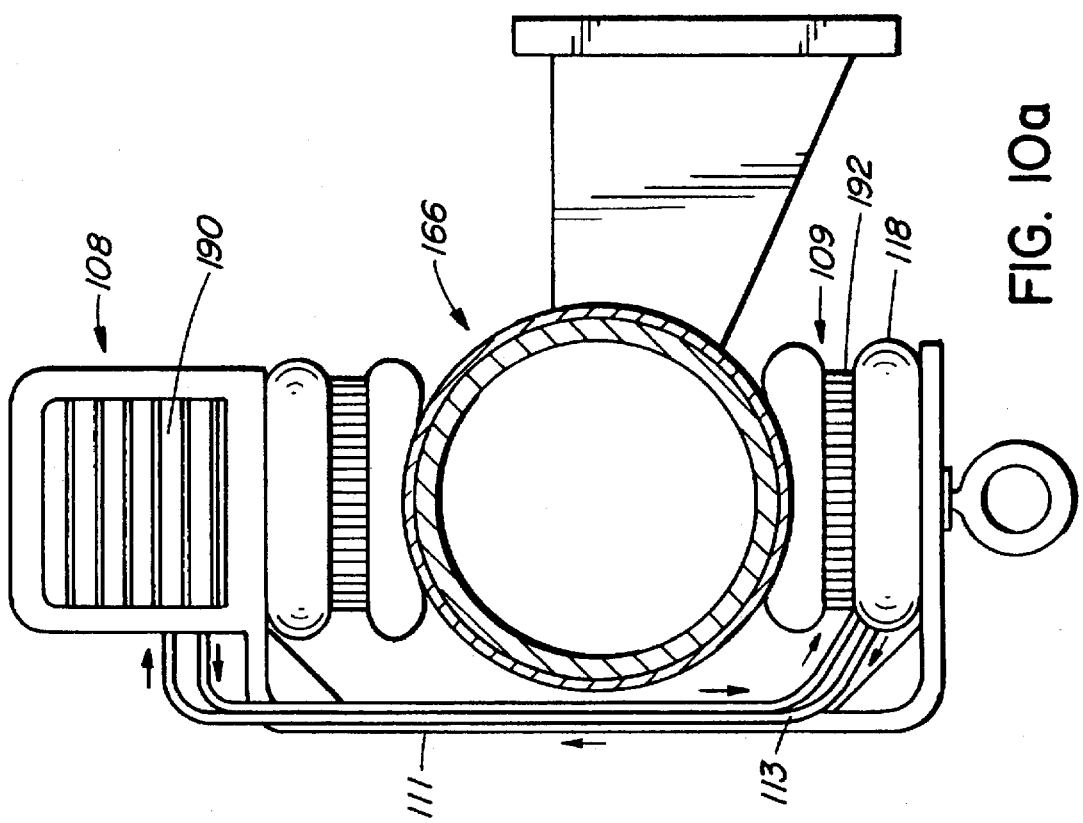
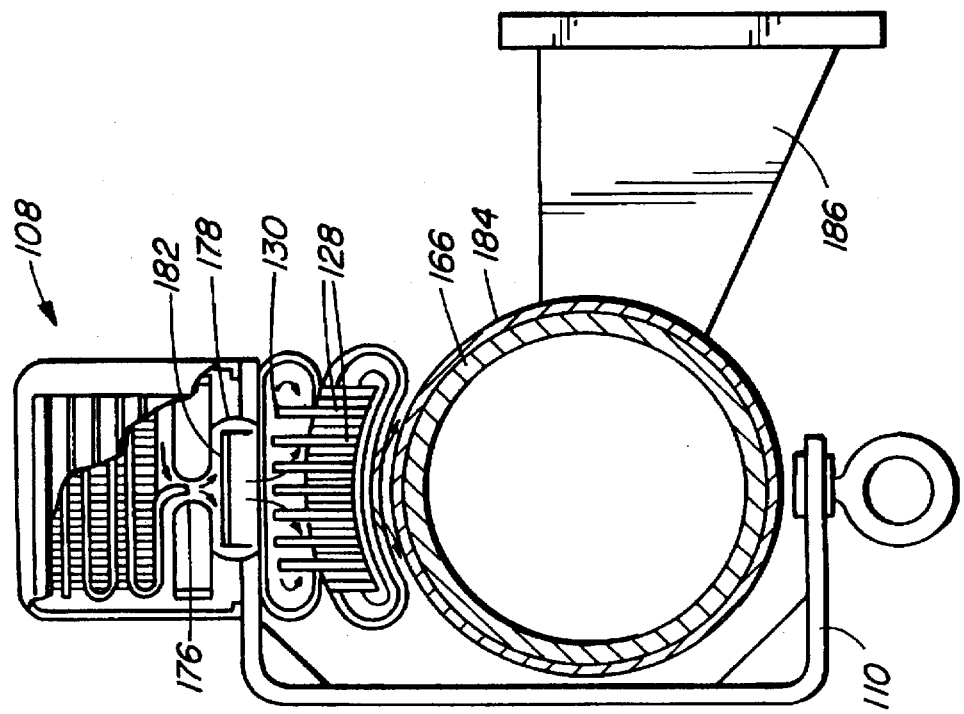

PRESSURIZED AIR-GAP GUIDED ACTIVE LINEAR MOTOR SUSPENSION SYSTEM

The present invention relates to linear motor technology in general and active configuration electromagnetic thrust propulsion systems using pressurized fluid-film gap suspension and directional guiding in particular. The invention involves improvements in such technology as it relates particularly to compliant air-bearing support and transport of loads on curved profile guideway rails at high speeds. No mechanical moving parts are required to maintain the directional guideway guiding or the magnetic gap between the flexible primary active element and the guideway rail secondary passive element. The system includes inherent braking and locking provisions and fluid cooling for high power duty cycle advantages.

BACKGROUND OF THE INVENTION

Powered guided linear motion can be provided by many means. These include the use of rodless cylinder or cable cylinder actuators which offer a number of significant advantages over other mechanical alternatives such as belts or chains, lead screws or cam/crank drives. The process of converting rotary motion into linear motion often necessitates the use of complex mechanical linkages as well as wheels and sub-assemblies. As a result, the use of relatively simple rodless or cable cylinders has become quite common, although some moving and sliding parts having lubrication requirements are still present. Pneumatic rodless or cable cylinders do provide a degree of production ease with high acceleration and speed at low cost. Specialist skills are not required for operation or construction and installation is relatively easy and safe. Control and accuracy are now available with hydraulic power application; however, the advantages of self-guiding and structural strength with compactness are generally countered by a limitation to a maximum length of cylinder travel of only 42 feet.

The use of electromagnetic propelled systems for linear transit is an alternative of considerable merit and is used extensively for speedy movement. In many applications high thrust powers are used over long travel distances. The present state of the art of electromagnetic propulsion by linear motors is based on technology which exhibits low efficiencies due to mechanical positioning complications and other operating requirements which include low service factors due to heat build-up. Many of these drawbacks are overcome to a significant degree by the present invention as described herein which combines the simplicity of guided air-film suspension with active type electromagnetic propulsion.

Linear motor technology used with air-film suspension is not new. U.S. Pat. No. 5,128,569 suggests ways of using linear motors whose widely spaced passive primary units are incorporated directly into parallel extruded trough-like rails equipped with air nozzles. In this case the air-bearing suspension maintains a minimal magnetic air-gap and supports the compliant runners equipped with the linear motor secondaries. These secondary element runners are attached to the underside of carrier decks for low friction powered load transport. The runners basically include a polymer covered cellulose multiple web winding around a full length core of narrow width. This assembly exhibits some vertical flexibility with horizontal stiffness. A generally full length pocket cut into the bottom of the runner cellulose accommodates curved metallic plates which provide a secondary linear motor electromagnetic element. The entire runner assembly possesses the necessary cushioned compliancy for air-bearing suspension as well as the means for providing induced current magnetism for linear thrust in co-action with the widely spaced primary linear motor units of the guideway support rail(s). The foregoing description of the USA patent is related to electrically connected passive primary linear motor elements mounted in air suspension support rails and operating in conjunction with active secondary linear motor runner elements which support load carriers and have no external electrical connections. Passive primary linear motor elements are particularly suited to applications for simple transport of unit loads on air-film rails and tracks. No additional mechanical wheels are required to maintain magnetic air-gap nor are separate guiding or energy source collectors needed. Possible drawbacks of passive primary linear motor systems are the need for multiple linear motor units, and extensive compressed supply air routing over long distances. Also, the number of linear motor units and the length of air supply duct required can be very high with associated cost and pressure drop penalties. For example, in a transport system of a mile in length, some (528) motors would be required if employing a 10 foot (coast) interval between each rail motor primary unit. The passive system however has advantages of modular design and hard wired circuitry with short on-cycle energizing of the motors for highest thrust powers.

Operating experience with the air-film track passive type primary linear motor systems has shown that high currents for high thrust pulses can be attained during the extremely short on-time energizing of the primary units. The heat produced would be a severe limiting factor of operation were it not for the full-time cooling of all motors provided by the suspension compressed air flowing through the rail linear motor primaries—including motors in the off-cycle mode. The suspension air flow provides continuous forced-cooling of the secondary elements as well as the motor windings by high-density and high-velocity air allowing a high duty cycle and use of very high momentary overload currents for unique high thrust generation.

SUMMARY OF THE INVENTION

Whereas passive primary linear motor systems have advantages when a large number of unit loads are moved over a relatively short guideway—active or moving primary linear motor systems have distinct advantages associated with moving a small number of unit loads over relatively long distances. Active primary systems require only a single or a minimum number of linear motor primary units with localized suspension and therefore need only a very small air supply. In the active primary system it is the support rail which provides the secondary element for induced electrical magnetic thrust interaction. The few drawbacks of moving electric primary elements include a need for continuous or modulating energizing currents (with associated continuous heat generation) together with the need for essentially a full guideway length power collector device.

Present state of the art active type primary linear motors are used extensively for monorail load movement applications which include industrial overhead conveyor networks, mainly in automotive assembly plants. These typically require mechanical support and guide wheels and relatively complicated braking systems. Support wheel guiding devices are unsprung and were it not for wear adjustment provisions there could be damaging contact between the linear motor elements. Strict maintenance schedules are employed as described in various patents such as Canadian Patent No. 1,280,991 issued Mar. 5, 1991 to Daifuku Co., Ltd..

All active systems require power collector devices. Most of these are of the mechanical sliding shoe type with inherent safety, environmental, and high maintenance drawbacks. The rubbing and arcing of the electrical contacts greatly contribute to contact failure and environment ozone duress.

Linear motor primary active (and passive) units are long and narrow assemblies with wire conductor field coils wound around slotted steel lamination plates bolted together. These assemblies provide a longitudinal moving magnetic field when energized with polyphase electric currents. Generally, such motors are very rigid, except for that suggested in U.S. Pat. No. 3,547,041 which describes vertically hinged linear motors to accommodate trolley beam curves in a generally horizontal plane but for which a means of maintaining air gap is not defined.

Generally speaking the present invention may be broadly considered to provide an active linear inductions motor (LIM) propulsion system comprising: a passive secondary in the form of at least one elongated rail member having transversely arcuate operating surface means; an active primary member for interaction with the rail member; and means for providing pressurized fluid between the rail operating surface means and the primary member to support the primary member above the operating surface means and to maintain a magnetic air gap between the primary member and the operating surface means; wherein:

(a) the rail member includes electrically conductive and ferromagnetic means in close proximity to the operating surface means over the length thereof;

(b) the primary member includes: a plurality of laterally adjacent, longitudinally extending and articulated ferromagnetic laminations, the laminations having a longitudinally toothed surface that is transversely arcuate to be complementary to the rail operating surface means; electrical windings wound about selected groups of teeth of the laminations as a LIM primary; compliant means adjacent the laminations, capable of deformation under load and at least partial recovery after load removal; power means for obtaining electrical power continuously as the primary member moves along the rail and supplying polyphase electrical current to the electrical windings; and cooling means contained in the primary member for continuously providing cooling fluid to the laminations during operation of the primary member; and (c) the means for providing pressurized fluid is adapted to inject pressurized fluid at high velocity into the space between the rail operating surface means and the compliant means to support the primary member above the operating surface means and to provide a minute pressurized magnetic and suspension gap between the primary and secondary members for efficient linear motor operation.

The advantages of operation of the present invention active linear motor in a fluid-film bearing suspension configuration are particularly enhanced when the primary assembly is the moving element on a simple passive concave or convex support guide rail made of an electrical conducting material. This guide rail could be a continuous aluminium pipe, an aluminium trough extrusion profile, or a conductively clad steel or iron pipe member. In any case a magnetic iron or steel backing can be used to increase the magnetism effect of the induced currents set up in the rail by the moving magnetic fields of the suspended primary element.

In the present invention the active linear motor primary elements are contingent to a fluid-film suspension mounting of a moving carrier platform which includes a relatively small pump or compressor with a fluid recirculation means through heat exchanger(s) and contaminant removal separator(s). An electrical power collector system for the linear motor is required for on-board powering. This system may typically involve a rectifier and inverter for current phasing with a control system of developed technology, along with a position sensing device such as an encoder. The present invention includes an optional means of using compliant fluid-film support for improved power collection.

The active primary linear motor of the present invention is particularly useful in those applications which require simplicity and efficiency of propulsion and braking operation for high speed travel over relatively long distance with minimal contact and maintenance. Applications could include multiple sequenced monorail air-film units as prevalent in overhead industrial assembly applications and in clean room or hygienic situations. The present invention suggests that such air-film suspended and tracked active primary linear motor systems are practical for extremely high speeds.

The present invention eliminates many of the existing mechanical and electrical limitations of mechanically suspended linear units by making use of externally fluid pressurized hydrodynamic compliant bearing principles for operating active type motors in a direct suspension arrangement. Flexibility of the primary linear motor assembly is a key requirement for operation in a compliant fluid bearing suspension. Described herein are many improvements by which the active primary element of a linear motor is incorporated into a fluid bearing suspension system by being made flexible while using a compliant pad layer and cover. An air-bearing and/or fluid bearing suspension system never herebefore achieved is provided.

At this point it should be mentioned that the specification hereinafter describes the present invention in terms of an air-bearing suspension or support system in which the active suspension or support medium is compressed air. It is also contemplated that in particular applications the system would work equally well using a pressurized liquid, such as water, as the active suspension or support medium. In its broadest form the present invention is thus presented as a system relying on pressurized fluid as the operating medium.

Improvements to electrical collector systems are also outlined herein. Such systems can enhance a non-contact inductive type electrical power pick-up system when applied to the air-film concept to eliminate the need for any mechanical positioning of the pick-up coil and virtually any physical contact in the entire system.

It should be noted that mechanical pick-up power contacts are prevalent at the present time but can be air-film guided and supported in a mini air-film system using a curved non-conducting support and guiding trough containing the power conductor strips for localized electrical power transfer as supported on a suitable loaded extension arm mounted on the active linear motor platform.

Induction coil means for power pick-up can also be employed to maintain the overall virtual absence of moving parts claim of the present invention. The exception to this claim will be the use of ancillary compressor and fan units. The present invention suggests several additional configuration improvements which allow the location and shielding of the induction pick-up coil primary conductors for proper containment of high frequency current radiation effects. As a result electrical powering of the system is carried out with environmental and safety advantages in a compact arrangement.

Also described are means of induced flow or forced flow primary motor lamination core cooling by the pressurized air or fluid supply as induced by inspirator or injector means in a closed-loop internal recirculation path and through internal heat exchangers. The induced injector flow should be directed onto extended motor core lamination cooling fin plates so as to take advantage of available thermal expansion cooling. Included in the fluid loop circuit is a means of removing contaminants and impurities such as water and oil vapours in compressed air by a separator/collector means. These removal devices are common to compressed air or fluid systems with discharge to a collector reservoir for periodic emptying or if appropriate to the atmosphere.

Recirculation of pressurized fluid is not restricted to active motors but can also be applied to passive linear motor systems. In the passive systems, the rail length(s) could serve effectively as the heat sink and could be combined with suitable radiator coolers at the recirculating fan or pump. The pressurized suspension fluid is recirculated through the multiplicity of rail profile ports by induced or mechanical means resulting in a rather lengthy system with continuous series internal cooling of the multiple linear motors. The heat sink provision of the rails would have the feature of rail heating for de-icing or drying as an inherent advantage.

The active linear motor system support incorporates a full length pad of cellulose web which allows interlocking motor core modules to flex a limited degree as required for the compliancy requirement of the suspension. A flexible airbag mounting arrangement for the primary linear motor assembly is a preferred means which in combination with the cellulose support pad or alone provides the compliant support for the flexing motor modules while also providing a spring air-ride cushion and a fluid chamber for heat pick-up from the motor module lamination extension fins as well as a small reservoir supply for the suspension nozzles.

The air-bag or fluid-bag support can employ a separate pressure supply. The suspension nozzles in this case would be supplied through separate pipes or tubing or plenum mounting which piping or plenum would then also be exposed to the cooling of the recirculating air or fluid.

Linear motors are not limited to air cooling only but can also readily employ liquid coolant for even greater thrust power duty cycles and efficiencies. A variation of a means of liquid cooling of linear motors in the public domain is the relatively impractical use of copper tubing wound as the electrical core field winding of the linear motor poles. In this case the coolant flows within the conductor tube windings.

Nozzle mounting for the active linear motors can be exacting. Teflon® or other non-magnetic and heat resistant small tubing is run through each motor module for connection to individual stainless steel or similar hypodermic tubing nozzles of generally 0.020 inch internal diameter mounted and fixed to the cover and ground off flush with the cover at a narrow 29 degree or shallower inclination to the rail surface and directed also at approximately 45 degrees to the rail centerline as it passes through the outside module cover as described in U.S. Pat. Nos. 4,185,399 & 3,952,666 & 3,875,163 . In the present invention the nozzles are fixed to the cover and are free to move with the cover while offering very little limitation to cover movement freedom. Each nozzle is connected to the heat resistant flexible tubing or from a small diameter flexible header through the cellulose or like compliant layering or directed to an adjacent small clearance cavity of generally 0.5 inch diameter and 0.3 inches depth provided in the cellulose. This cavity provides a further degree of nozzle freedom and will contribute to desirable localized vibration or jackhammering and dither effects for assisting in the air-film propagation action.

The present invention embodies specific improvements to the primary element of an active linear motor system using a cooling system and power collector systems for operation in a compliant air-film bearing mode with high thrust capabilities without the use of any mechanical means to maintain a magnetic gap or guiding or cooling or even power collector operation. Active linear motor technology represents specific improvements to the application of air bearing support and powering of conveying systems and high speed transportation systems.

In particular there are described herein improvements to the carrier active electromagnetic element as well as to cooling of this element and further to electric power collection.

Location monitoring and speed control of the active linear motor primary assembly are generally provided through encoder comb markings along the guideway or laser doppler systems or satellite position locators for wireless communication to a base station for digital feedback computation in conjunction with an onboard microprocessor. This is important for control of headway clearance and for safety or trouble location in the overall transit system. A remotely controlled directed shutdown automatically stops any primary module and automatically applies inherent rail locking and holding brake features.

Rail for the active primary linear motor system is generally transversely convex as might be more common with pipe system guideways as described in U.S. Pat. No. 3,952,666 although it is possible to have the curved rail support surface transversely concave as described in U.S. Pat. No. 5,128,569. It follows that rail interaction can also take place on a top portion of the outside convex surface of a pipe, a longitudinal sector of a pipe, both the outside top and underside of a pipe, the internal concave bottom of a pipe, or both the internal concave upper and lower surfaces of a pipe sector.

Guiding is provided in all cases through the air-film suspension interface of the curved linear motor iron core laminations and compliant layer with polymer cover which mates and coacts generally with the curved underneath adjacent surface of the support rail(s).

Pressurized air from the small onboard compressor of generally 2 to 4 horsepower is cooled and is coursed through the core windings and laminations prior to entry at high velocity into the suspension air-film interface through the very small air nozzles in the polymer cover of the compliant cellulose layers. Passageways provided through or provided in the face of the core ferromagnetic laminations of the linear motor allow the threading of the flexible Teflon® or similar heat resistant tubing for direct connection of compressed air through the cellulose layers and thence through conjunctive holes, slits, pores or small bore hypodermic tube nozzles angularly fixed in the polymer covering. The air supply passing through the primary windings and laminations and compliant coverings effectively provides extra cooling for the continuously operating primary assembly. This embodiment alternatively makes use of a separate piping header or plenum supply dedicated to the suspension nozzles. In this case the separate header or plenum is independent of the linear motor cooling fluid flow. Since nozzle flow does not require any cooling of the heat of compression the resulting cooling load reduction allows increased availability for heat removal from the primary core for even more efficient operation.

LIM cooling may be enhanced through the provision of extended core lamination plates. Extended plates project proud of the top of every two or three standard (shorter) lamination plates of each LIM module. Transversely adjacent standard core plates are next to evenly spaced extended plates providing exposed finned air passage clearances for heat dissipation. Extended lamination plates are manufactured with the upper portion not less than a quarter depth more than standard lamination plates. The lamination plates otherwise include a plurality of longitudinally spaced generally rectangular teeth along the bottom operating portion which contain the magnetic electrical pole windings to coact with the secondary (support and guiding) element. A general mating profile of the lamination plates to the curved secondary element is achieved by a slight vertical displacement of the lamination plates relative to each other as described in U.S. Pat. No. 5,128,569. Alternately the lamination teeth can be of different depths so that the innermost teeth have a lesser depth than the outermost laminations (for a convex rail) or the final assembly of laminations may be machined to provide the required matching pole face curvature. The addition of the compliant filler material and cover completes the air bearing requirement for coaction with the curved secondary rail(s).

The side assembly surfaces of the core lamination plates can also be provided with vertical or near vertical top to bottom grooves on at least one side to allow compressed air flow between adjacent plates to the compliant padding and polymer cover and even to the air nozzles. This flow not only provides the necessary air for the suspension interface but provides efficient additional cooling of the linear motor core. The use of separate tube piping to each nozzle is preferred, however, as pressurization of the entire compliant layer system resulting from through-plate air flow requires some reinforcing or venting to reduce cover ballooning. This can be through additional nozzles in the compliant filler cover or through clearances along the sides of the LIM core, either of which could be wasteful of air.

Core lamination plates are assembled into separate modules which have mating end profile projections and recesses so as to provide interlocking and hinged sectionalizing of the linear motor core. Specific radial clearances at the end faces of the modules allow for slight relative flexing between adjacent modules for enhancing an overall assembly compliancy. A relatively thick cellulose ply pad, an air bladder, or a fluid bladder type spring loading system facilitates the necessary flexing movement. The interlocking extensions of the lamination plates assist in the magnetic flux between modules. Alignment, vertical plane rotation, and magnetic continuity are assured with the rounded pivotal projections of alternate plates fitting tightly into slightly larger radius rotational recesses of the next adjacent module. This pivoting contact allows some vertical flexing without having to resort to pinned hinges. The modules are held together in close contact by an encircling external tension member such as a rubber band or by a non-magnetic spring which does not hamper the flexing motion of the interlocking core modules. Alternatively, hinge pins can be used to eliminate the need for external tensioning and can be of ferromagnetic material or non-magnetic brass or Teflon® material.

Field windings of the active LIM are interconnected at the pivot areas so as to permit a degree of movement of adjacent core modules. One means of winding with flexing allowance is provided by looping of the windings and the use of flexible encapsulation which is available from those skilled in the art of manufacturing linear motors.

Suitable flexible seal strips or rod "spaghetti" or tubing of near plate thickness at each linear motor module interconnection reduce or prevent air leakage through the module flex joints.

The LIM cooling recirculation system comprises a jet injector-type venturi to induce and force the compressed air or fluid through the core fins and subsequent heat exchanger(s). The heat exchanger(s) remove both the heat of compression as well as the heat picked up from the top core fins of each linear motor module. In the air bladder springing system the injector recirculates the air while adding sufficient make-up air to sustain the suspension air-film nozzle flow. Of course it is recognized that electrically driven fan or pump devices can be utilized to recirculate this cooling compressed air or pressurized fluid. With an injector the endothermic expansion reaction is of additional cooling advantage especially if it takes place immediate to the LIM cooling fins. Suitable filtering and separator means well known to those skilled in the art of using compressed air or fluid flow are included in the recirculation loop preferably at the coolest and lowest velocity sections.

Removal of moisture and water and oil vapour from the recirculated air can be achieved immediately after injector cooling by a typical coalescent filtering separator bowl fixed below the injector and flow venturi. Rotational vanes in the filter impart a rotational spin to the flow to assist removal of the condensed moisture by centrifugal effects and gravity to a small bottom sump. A protruding "dry-pipe" air exit can preclude air droplet carryover. Water removal bleed from the sump to an automatic discharge commonly used in filters will allow for periodic visual inspection of the water removal operation process. Water removal takes place at the coolest part of the motor assembly, usually at the extreme lower front.

Ferromagnetic core lamination plates of the primary element are assembled to provide multiple teeth protrusions which are electrically conductor wound to create a plurality of magnetic poles which are energized in travelling field sequences usually by the application of polyphase electrical current. Motion of these magnetic poles relative to the electrical conductive metallic secondary surface induces electrical currents in this surface. In response to these current flows there are corresponding magnetic fields set up according to well known electrical and moving magnetic flux principles. Resulting strong attractive (or repulsive) reaction between the primary field flux and secondary surface flux provides powerful longitudinal thrust forces for load movement on the guiding suspension pressurized airgap. Radial magnetic attractive forces are easily handled as a load surcharge by the suspension.

High power performance is dependent upon the capability of handling extremely high currents without undue heating of the primary element winding insulation. Heat deterioration of the insulation is accumulative and the so-called "Duty Cycle" is determined for each motor design to limit accelerated deterioration. The higher this rating—the higher the current rating and power capability of a motor. Winding insulation cooling means of the present invention is of paramount importance in the ability of the primary to handle the high currents and powers.

Wire for the LIM primary windings is wound over two longitudinal tubes which are withdrawn usually after encapsulation of the main core. The removal of these tubes provides cooling air flow ports right through the motor windings, as described in U.S. Pat. No. 5,128,569. Further cooling means for the present motors is provided by the finned extensions of the core lamination plates which release heat to the relatively cool recirculation air flow as previously described.

The extension fins and the intermodule pivotal interlocking means for core module articulation are kept free of epoxy encapsulation, when used, by the use of special slotted seal blocks fitted during the manufacturing process to cover those portions of the core lamination plates which must be kept free of encapsulation. All lamination projections which are to be free of epoxy are precoated with release agent to facilitate seal block removal.

Compliant air bearing operation requires a small pad of cellulose plies or like filler material between the linear motor pole faces and a continuous longitudinal enclosing cover. The configuration of the curved core face with the cover and filler plies is similar to that of the minimum cellulose runners of U.S. Pat. Nos. 4,838,169 & 5,090,330. The filler and cover are formed from materials that are capable of deformation under load and at least partial recovery after the load has been removed and have the capability of withstanding the high LIM operating temperatures and some suspension transient seal area friction.

The sectionalized and interlocking laminations for articulation of the linear motor core modules have a tendency to vibrate minutely in sympathy with the frequency of the energizing current. Vibration of this type can be desirable as it can lessen seal area friction of the compliant cover with the effects known as stiction or dither. Any audible noise present because of this effect will be muffled by the cover and compliancy layers so as not to be an intrusion to the normal very low audible levels of operation.

Means for ducting the compressed air through the core laminations of the linear motor by angled cut slots in the plates is described in U.S. Pat. No. 5,128,569 with general manufacturing methods being disclosed therein. Unencapsulated LIM cores can be employed for the LIM motors. The core laminations without epoxy encapsulation can use plates with one side thereof having vertical or near vertical grooving for through-core cooling air flow between adjacent laminations. Alternative use of thin Teflon® or the like washer spacers between lamination plates can allow through-flow of cooling air but this also reduces the core ferromagnetic density and may reduce the available thrust somewhat.

Active LIM units require that the guideway support contains or is the secondary element for the electromagnetic co-action propulsion. This guideway secondary member of curved profile is a usually a binary metal rail as supported on grade, on elevated steel or aluminum structures, or on other materials or structures such as formed concrete. In all cases the guideways include electrically conductive and magnetic sensitive materials. Some rails are clad on the exterior with copper or aluminium or like electrical conducting materials over ferromagnetic materials. The rail conductive cladding for induced current capability also provides protection from atmospheric oxidation of the suitable steel magnetic portion of the secondary element. Carried to an extreme, a rail could be the inside of a conductive pipe with ferromagnetic materials positioned on the outside at positions of most effectiveness. Claddings or support surfaces are selected with friction reducing properties in mind and can be augmented with low friction coatings, stainings or impregnations to further reduce seal area contact friction of the moving primary compliant covering. Friction reducing materials such as molybdenum disulphide powders or the use of motorized cleaning or application devices such as rotary brushes or wipers are options which can be included on the leading edge of the moving primary motor assembly.

Motor power collector devices of the non-contact type are preferred. With these, power supply conductors held in adjacent rail protective enclosures are used for the secondary power current supply. An air-film suspension arrangement for the collector device has been described previously and can also be employed in a similar assembly with the non-contact collector. A suspended coil(s) assembly is attached to and moves with the primary linear motor assembly. High frequency current is induced in the pick-up coils in close proximity to the power conductors (electromagnetic fields) somewhat similar to a reverse of LIM action but similar to transformer operation. Induced currents are rectified and inverted by onboard devices to the required polyphase cycle current for the LIM motor thrust generation. High frequency of the primary supply assures good coupling of the supply currents and the induced currents of the power coils.

Environmental concerns are very important and are accommodated in the general make-up of the collector portion of the present invention. Special attention is made to confine any electromagnetic wave influences generated. Aluminum grid plate or similar shielding of the linear motor end windings precludes inadvertent induced current problems with personnel or with motor coils in proximity to the power supply conductors. Various remote mountings of the collector coil arrangement reduce undesirable effects. Power conductors are enclosed and shielded so as to contain the electromagnetic fields. Use of extruded polymer supporting brackets for conductors in a continuous manner for the entire rail length is considered a safety provision. Electroplated or similar outside surface metallic coating is provided on the conductor brackets with multiple slot interruptions so that induced current continuity is blocked, yet this coating serves to shield any radiation as well as to inhibit and restrict any extraneous induced electric currents and associated heating which may be set up in any adjacent metal parts. Minor heating effects can be an advantage to heat the rails for cold or freezer or icing conditions.

Other features of the present invention will be described hereafter and with reference to the drawings.

BRIEF DESCRIPTION OF THE DRAWINGS

FIG. 5*i* shows an inductive type non-contact pick-up system and FIG. 5*ii* shows a spring-loaded sliding type pick-up more commonly used in present day applications.

FIG. 10 is a cross-sectional view of the active linear motor prime mover showing a monorail assembly in co-action with a secondary pipe type support.

FIG. 10*a* is a cross-sectional view of an active linear prime mover showing a monorail assembly with a double, or upper and underside, positioning of linear motor units in co-action with the same secondary pipe type support rail. This arrangement in effect doubles the thrust available with essentially the same (one) pressurized air supply. The underside linear motor unit is positioned against the secondary via a supplementary loading system (in addition to the magnetic attraction usual with this motor) as shown by the use of a flexible air bag spring mounting very similar to that of the upper system.

DESCRIPTION OF THE PREFERRED EMBODIMENTS

Figure 1:
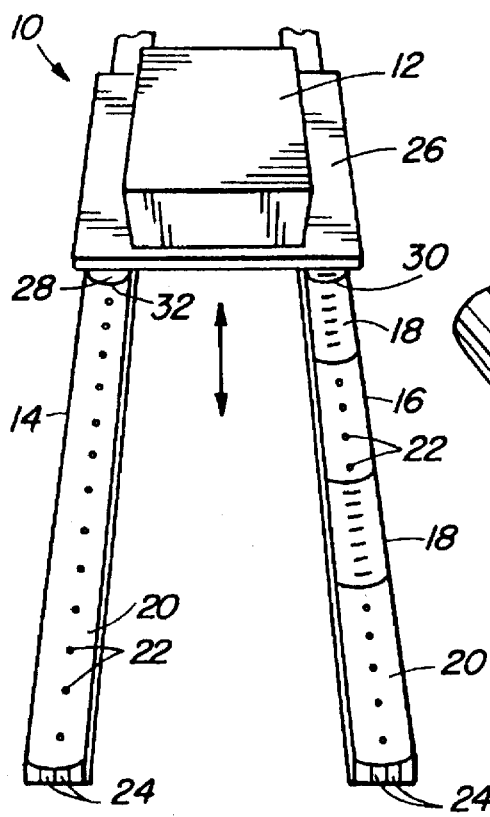
FIG. 1 is a perspective view of a prior art passive LIM support and conveying system showing a track system incorporating several linear motor primary modules in accordance with present developments of the passive pressurized air-gap linear motor propulsion system.

FIG. 1 shows the general arrangement of a typical SAIL-RAIL® air-film bearing suspension system 10 for conveying unit loads 12 on typical parallel air-film trough rails 14 and 16. Rail 16 is similar to rail 14 but is equipped with rail profile linear induction motor (LIM) primary elements 18 incorporated as part of and spaced along the rail 16. All rails and motors have a transversely concave upper working surface 20 and all have a plurality of longitudinally spaced angled nozzles 22 which extend through the surface 20 to pass pressurized air from longitudinally extending ducts 24 within the rails or from air plenums attached to the underside of the motors to the surface 20. The teachings of U.S. Pat. Nos. 3,875,163; 3,952,666; 4,185,399; and 5,128,569 relating to this technology are hereby expressly incorporated by reference.

The load 12 is shown resting on a deck 26 which in turn is supported by a pair of runners 28 and 30 which extend the length of the deck 26 and are received in the corresponding rails 14 and 16. As can be seen each of the runners 28 and 30 has a corresponding convex lower operating surface 32 that is complementary in curvature to the rail and motor working surfaces 20. The rail and motor upper working surfaces 20 are collinear to ensure a smooth transition of the runners 28 and 30 as the load travels along the rails and primaries.

Figure 2:
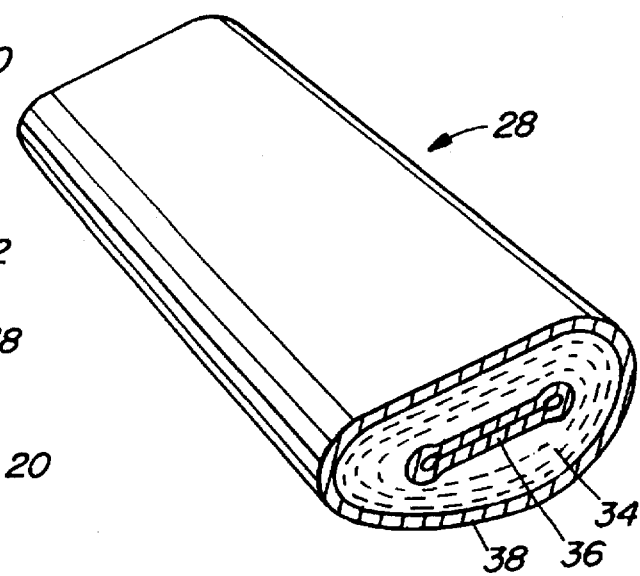
FIG. 2 is a perspective view of the compliant runner support of the present air-film suspension system showing the wound cellulose web as wound around a central paperboard core and then covered by a polymer sheet.

The runner 28 as shown in FIG. 2 is typical of a long length compliant support air bearing runner with a continuous cellulose ply 34 tightly wound around a circular core 36 and then compressed flat by vertical loading onto a transversely concave form identical to the working surface 20 with the resulting shape then being covered with a polymer or similar cover sheet 38.

Figure 3:
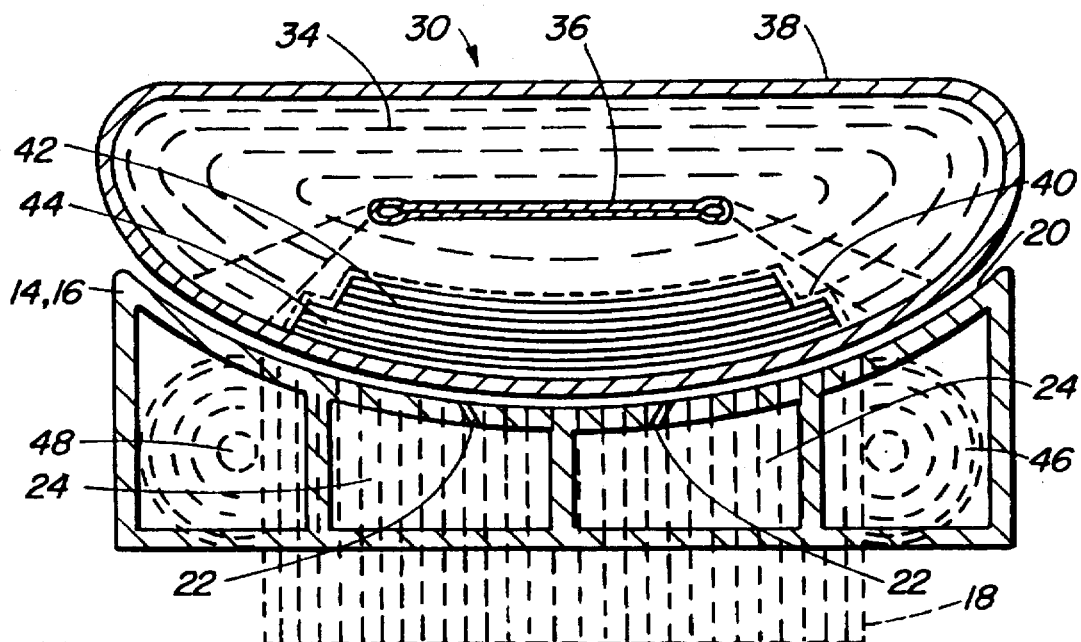
FIG. 3 is a composite transverse sectional view of a runner such as in FIG. 2 but which has had a longitudinal pocket cut partially into the wound cellulose web for the inclusion of ferromagnetic and electroconductive plates to form the secondary of the passive LIM system.

The runner 30 as shown in FIG. 3 is similar to runner having cellulose 34 wound on previously round core 36, with the same compressed shape and having a polymer sheet cover 38, but it differs from the runner 28 in that the cover is of high temperature capability such as Teflon® and a longitudinal pocket 40 is cut into the outside underside convex portion of the cellulose to closely accommodate thin ferromagnetic sheets 42 and thin electro conductive sheets 44 of copper or aluminum which have been curved to match the required radius to suit their juxtaposition in the runner. These plates serve as the secondary element of the passive linear motor in which the moving magnetic fields of the passive primary induce electric currents in the conductive plates to set up related magnetic fields in the ferromagnetic plates which co-act with the travelling magnetic fields of the primary to produce longitudinal thrust. The flexibility of these plates is important with the application to the compliant air bearing usage and to this end the ferromagnetic plates are slotted or segmented and taped together to increase their vertical flexibility (especially with curvature stiffening).

Also shown in FIG. 3 is a sectional view of a typical rail 14 or 16 showing the upper concave working surface 20 and internal longitudinal ports 24 which supply air to nozzles 22. The nozzles are angled in the rail working surface between LIM sections 18 but are oriented essentially vertically within the LIM core plates as shown within the superimposed LIM section 18. The LIM windings 46 and the blow-through cooling passages 48 for the compressed air supply to the rail nozzles are shown also.

Figure 4A:
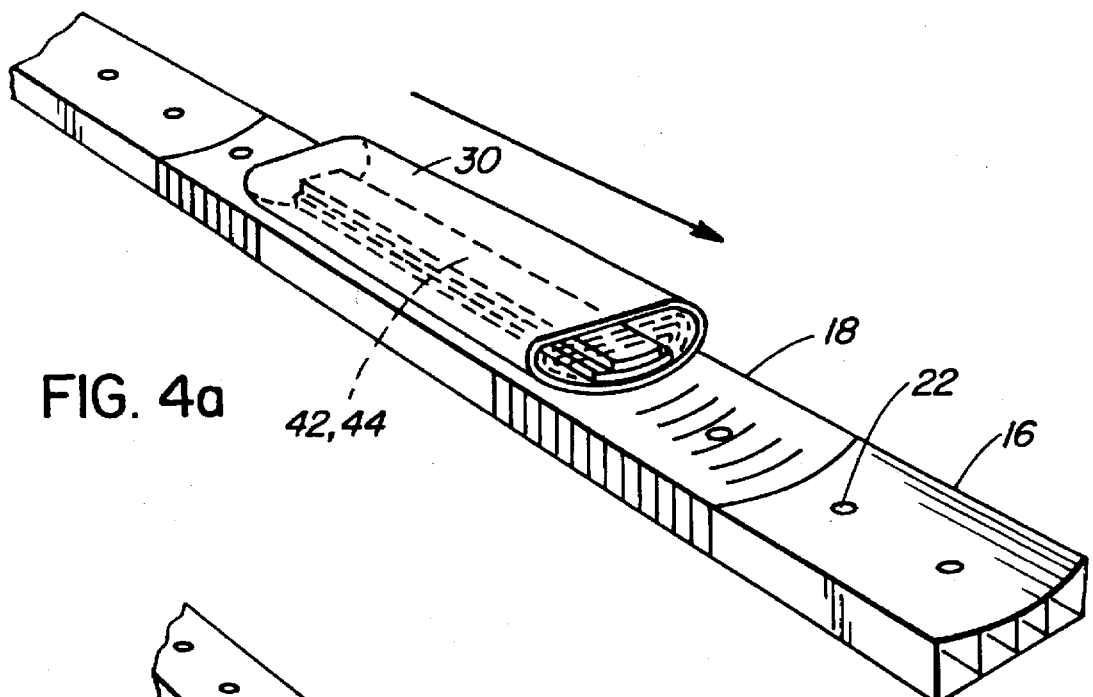
FIG. 4a is a perspective view of the basic passive type air-film pressurized air-gap electromagnetic propulsion suspension system showing the air nozzles of a typical concave support rail which incorporates curved rail profile primary linear motors at intervals therealong to impart thrust to a compliant runner which incorporates the secondary coactive plates of the linear motor system.
Figure 4B:
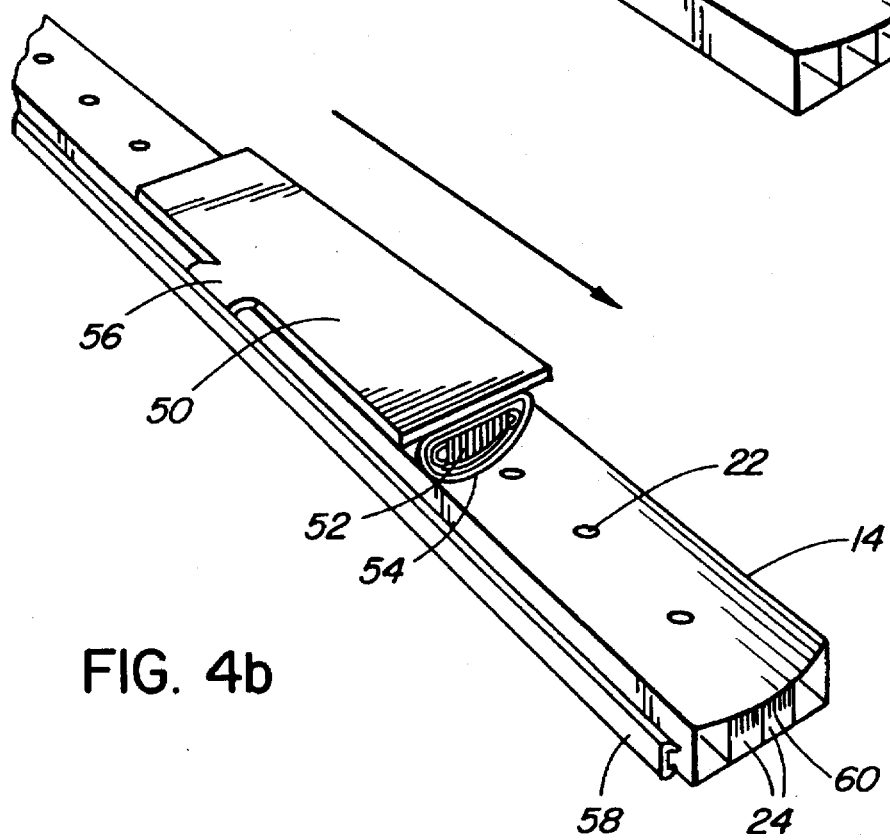
FIG. 4b is a comparative perspective view of the basic active type air-film pressurized air-gap electromagnetic propulsion system of the present invention in which the primary element of the linear motor propels itself along the support using the conductive properties and guiding trough profile of the rail for both the secondary electromagnetic element and the suspension. Necessary electrical power pick-up for the suspended primary linear motor element is shown as an adjunct collector along the rail.

A comparison of the passive and active types of the compliant bearing pressurized air-gap linear motors is illustrated diagrammatically in FIG. 4a and FIG. 4b. In FIG. 4a runner 30 is shown in air-film suspension with an extruded aluminum rail 16 and nozzles 22 while being moved forwardly by its internal secondary plates 42 and 44 in co-action with the stationary LIM primary elements 18 in the rail. FIG. 4b shows an active LIM system of the present invention in which the runner assembly 50 is air-film suspended by the nozzles 22 in an extruded aluminum rail 14. This runner contains flexibly hinged LIM primary modules 52 that generate longitudinally travelling magnetic fields and induce currents and corresponding magnetic fields in the extruded aluminum rail 14, which fields in turn co-act with the LIM runner travelling magnetic fields to produce a longitudinal thrust force. The active LIM runner 50 is suspended and guided on the pressurized air at the runner/rail interface as produced by air exiting the rail nozzles 22 and co-acting with the compliant covering 54 of the LIM modules 52. The power to the LIM runner is shown being supplied by an electrical collector 56 in a protective insulated semi-enclosure 58 attached to the side of the rail. Ferromagnetic plates or bars or the like 60 are inserted into the rail internal ports 24 to provide the necessary magnetic reinforcement of the LIM secondary which in this case is the continuous rail 14.

Figure 5:
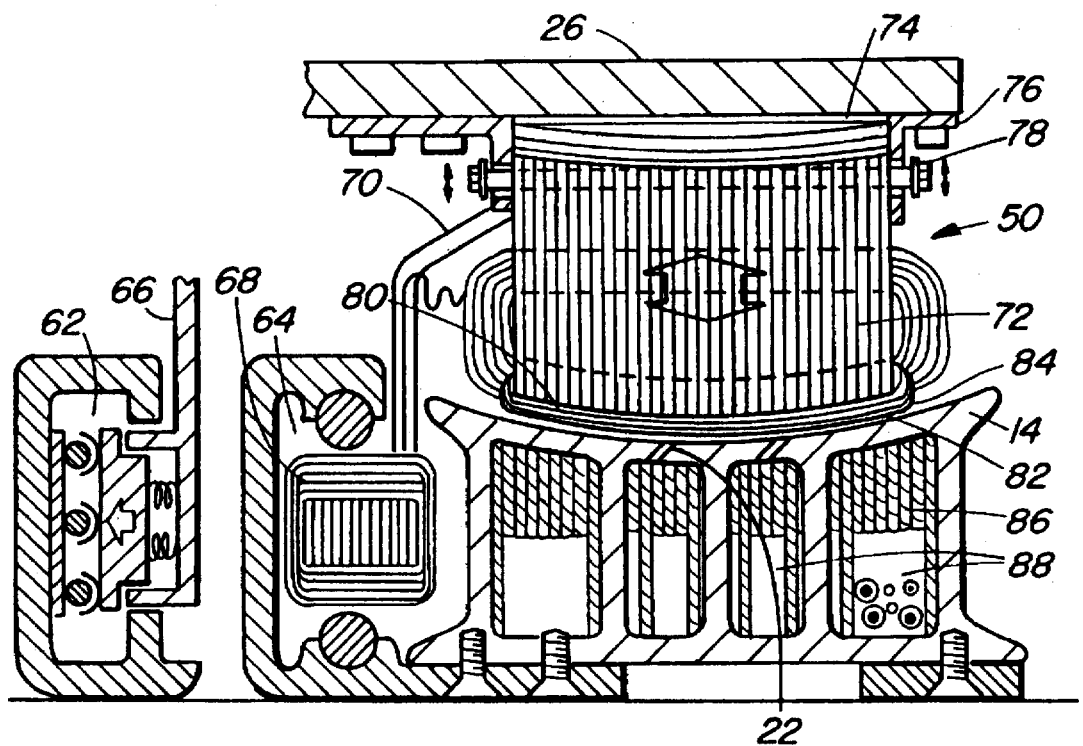
FIG. 5 is a sectional view of the active type pressurized air-gap flexible primary linear motor system of the present invention showing a compliant primary module mounting and a typical air-film support and guiding rail with air nozzle supply of compressed air to the rail secondary/runner primary interface and indicating the inclusion of internal ferromagnetic plates in rail ports and the adjunct power collector as attached to the rail.

FIG. 5 is a cross section of an active LIM runner 50 of this invention as assembled with a typical deck plate 26 and suspended by pressurized air from nozzles 22 in aluminum rail 14. Alternative power collector semi-enclosures are shown, with the usual sliding spring loaded direct conductor contact type 62 or a newer inductive type non-contact collector 64 with rigid pick-up devices 66 or 68 attached to the deck plate 26 by a bracket extension 70. The flexibly hinged LIM modules 72 of the active runner 50 are supported by an upper compliant cellulose pad 74 which allows limited vertical intermodule movement of the hinged LIM modules 72. The mounting brackets 76 of the LIM modules 70 are such that the fastening bolts 78 of the LIM modules are free to move vertically in slotted means provided in the brackets 76. The convex working faces of the LIM modules are covered with a continuous pad 80 of a minimal number of cellulose web plies 82 and a polymer outer cover sheet 84. The ferromagnetic laminations 86 added inside the ports of the rail 14 include air and control wire passages 88 to allow air flow through the rails and to the nozzles.

Figure 6:
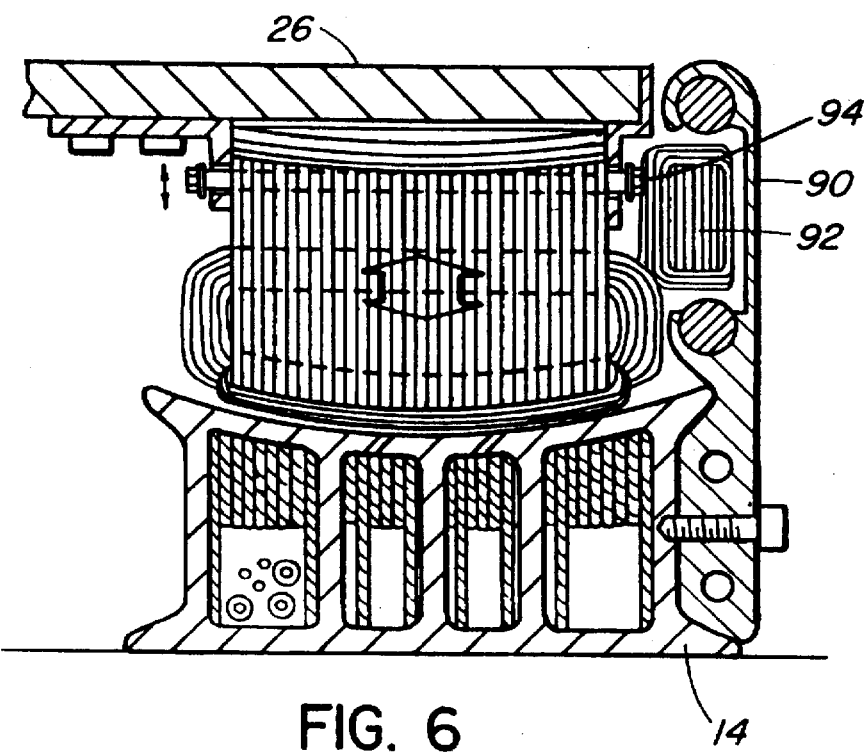
FIG. 6 is a another sectional view of the active type pressurized air-gap flexible primary linear motor system of the present invention showing a compliant primary module mounting and a typical air-film support and guiding rail with air nozzle supply of compressed air to the rail secondary/ runner primary interface and indicating the inclusion of internal ferromagnetic plates in rail ports and the adjunct power collector as attached to the side of the linear motor module in a more compact arrangement of a non-contact inductive type pick-up.

FIG. 6 is an active LIM runner similar to that of FIG. 5 but with a more directly connected power pick-up assembly 90 bolted by a commonly used spline profile to match the side cavity of the rail 14. An inductive pick up 92 is connected to the runner by a bracket extension 94.

Figure 7A:
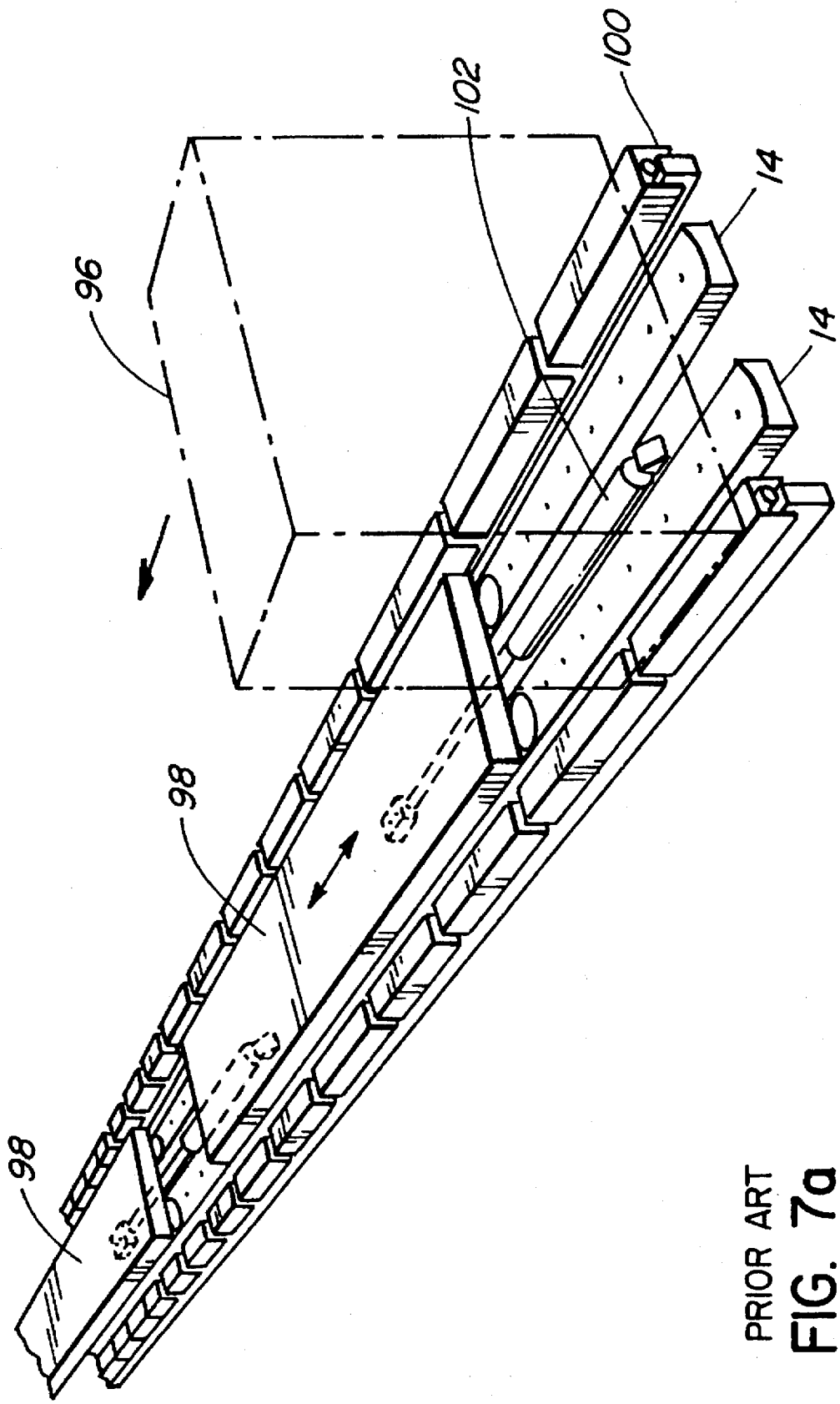
FIG. 7*a* is an illustration of a prior art material handling application in which an air-film suspension is used for the indexing movement of goods on multiple cylinder driven reciprocating air suspension platforms which co-act with air tube type lifts for raising and lowering loads to accumulate and convey such loads over distances of up to 200 feet. Multiple platforms (usually five load capacity) are used; they are automatically sequenced to transfer loads from platform to platform for high density storage and staging.
Figure 7B:
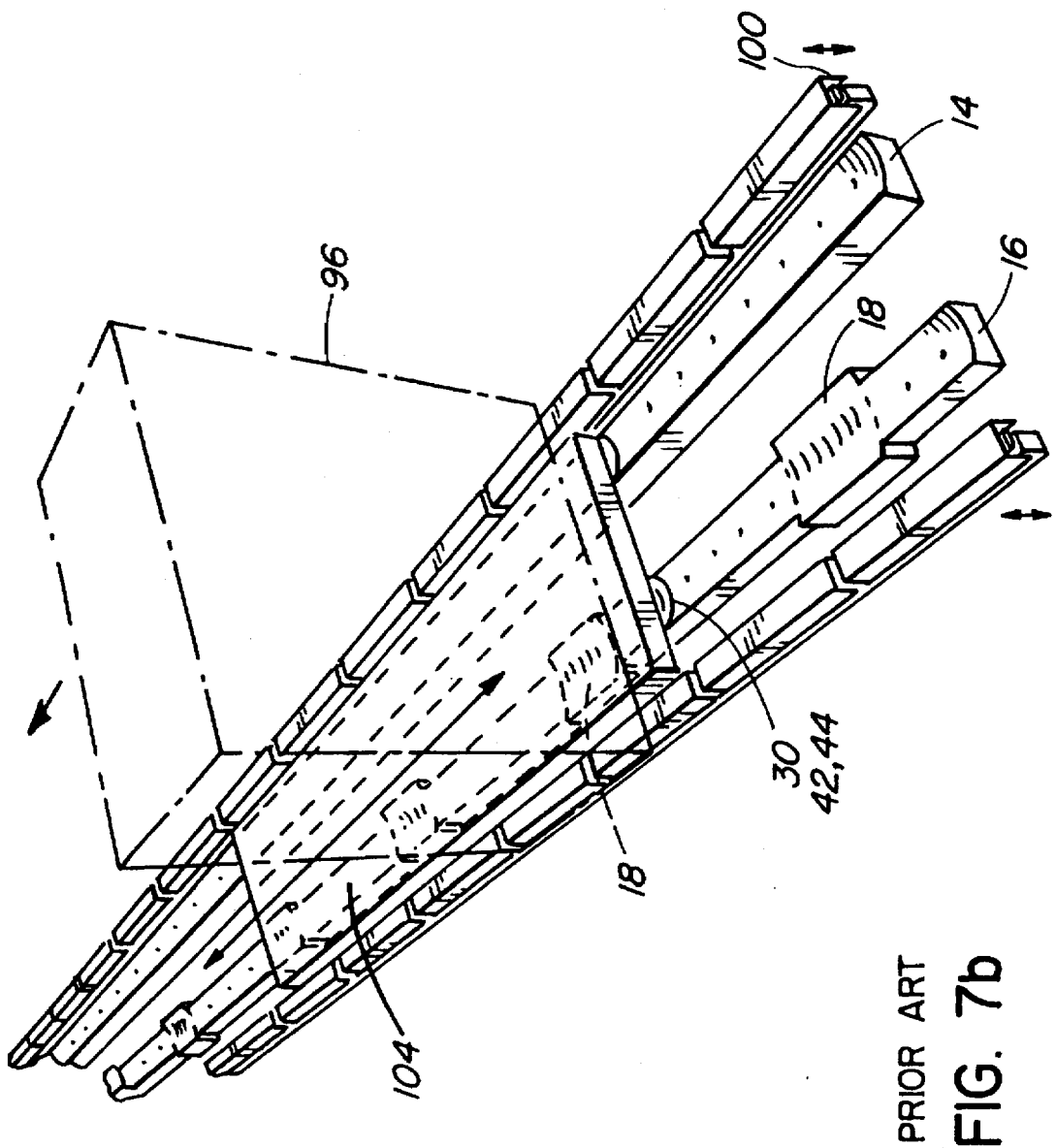
FIG. 7*b* is an illustration of a prior art material handling application similar to that of FIG. 7*a* but with the use of passive type linear motor powered movement (instead of pneumatic cylinders) of only a single platform for essentially the same load capacity. The single platform is programmed to operate over the full 200 foot length of the conveying system for the accumulation and staging and high density storage of unit loads but more quickly and smoothly with virtually no moving parts.

FIGS. 7a and 7b are perspective sketches showing examples of how LIM propulsion can be used to advantage in existing air-film material handling systems. The example application shown is a typical length of 100 feet and is usually installed on the floor of a warehouse. Multiples of loads 96 are loaded into the system and are moved and accumulated through the use of air-film suspended moving platforms 98 which shuttle back and forth in floor (or rack) mounted rails 14 and 16. Inflatable hose assemblies 100 lift the loads 96 clear of, or lower the loads 96 onto, the platforms 98 which, with reciprocating movement in a programmed sequence, intermittently move or accumulate these loads in an indexing manner for staging or storage or conveying with a minimum of moving parts.

FIG. 7a shows a present day pneumatic cylinder means 102 for moving the platform 98 one load position space equal to the full stroke of the cylinder. Movement is stepwise and relatively slow and requires the use of multiple platforms (four in the case of the 100 foot length shown) with overlap transfer and position indicating sensors all as operated from a central programmable control.

FIG. 7b shows a similar 100 foot length means for moving or accumulation or staging or conveying multiple loads 96 except in this case one of the support rails 16 for the single platform 104 contains ten (10) passive rail LIM primary units 18 as spaced 10 feet apart to co-act with at least one (1) platform runner 30 equipped with LIM secondary plates 42 and 44 as shown in FIG. 3. In operation the single platform 104 moves on air-film rails 14 and 16 over the full 100 foot length of the conveying or accumulating or staging system. Movement of a single platform is relatively fast and continuous without the incremental reciprocation movement of the FIG. 7a structure. Overall control is also achieved with the use of a central control and location sensors or encoder devices or doppler pulsed laser devices well known to those skilled in the art.

Figure 7C:
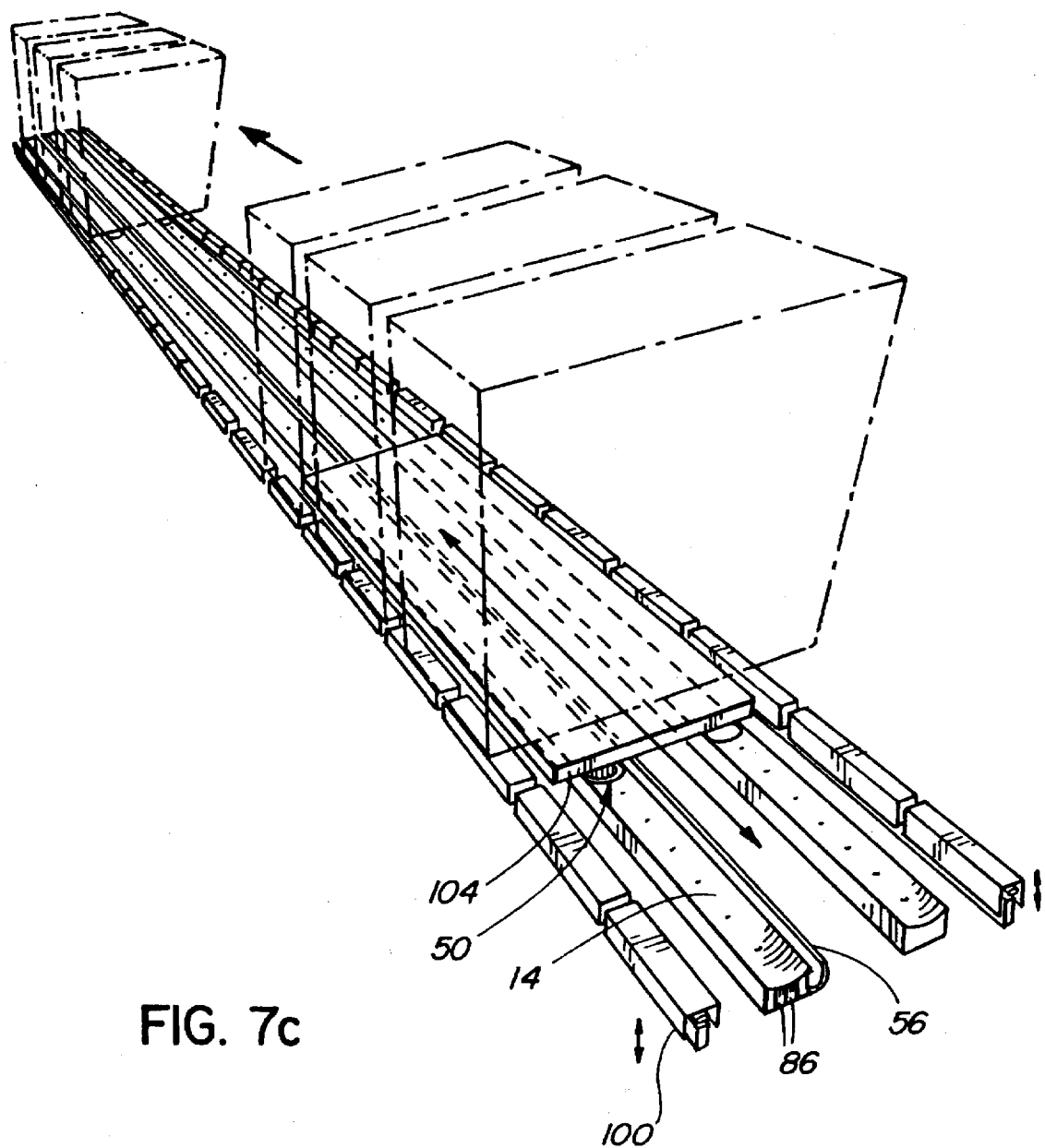
FIG. 7*c* is an illustration of a prior art material handling application similar to that of FIG. 7*a* and FIG. 7*b* but with the use of active type LIM powered movement of the present invention (instead of multiple pneumatic cylinders or multiple passive linear motors) and using only one platform and one LIM system for reduced complication and increased travel distances. The single platform of the present invention is programmed to operate over the long distances of the conveying system for the accumulation and staging and high density storage of unit loads at each end of an extensive travel distance, but more quickly and smoothly than any prior art system and with virtually no moving parts.

The examples of FIGS. 7a and 7b have been described so as to illustrate the advantages that can be gained by using passive LIM primary units 18 instead of pneumatic cylinder operation means 102. FIG. 7c illustrates the further advantages associated with using only a single active LIM primary system 50 of the present invention instead of ten (10) passive LIM 18 as shown in FIG. 7b.

FIG. 7c shows the rail 16 replaced by a rail 14 (without LIM units) which is augmented with internal ferromagnetic secondary plates 86 and an attached power collector 56. The single platform 104 is equipped with an active LIM unit 50 The use of only one active LIM unit 50 over the requirement of ten (10) passive LIM 18 units and all associated extra wiring and starters and sensors clearly indicates the advantages of the active units of the present invention in just this one example.

Figure 7D:
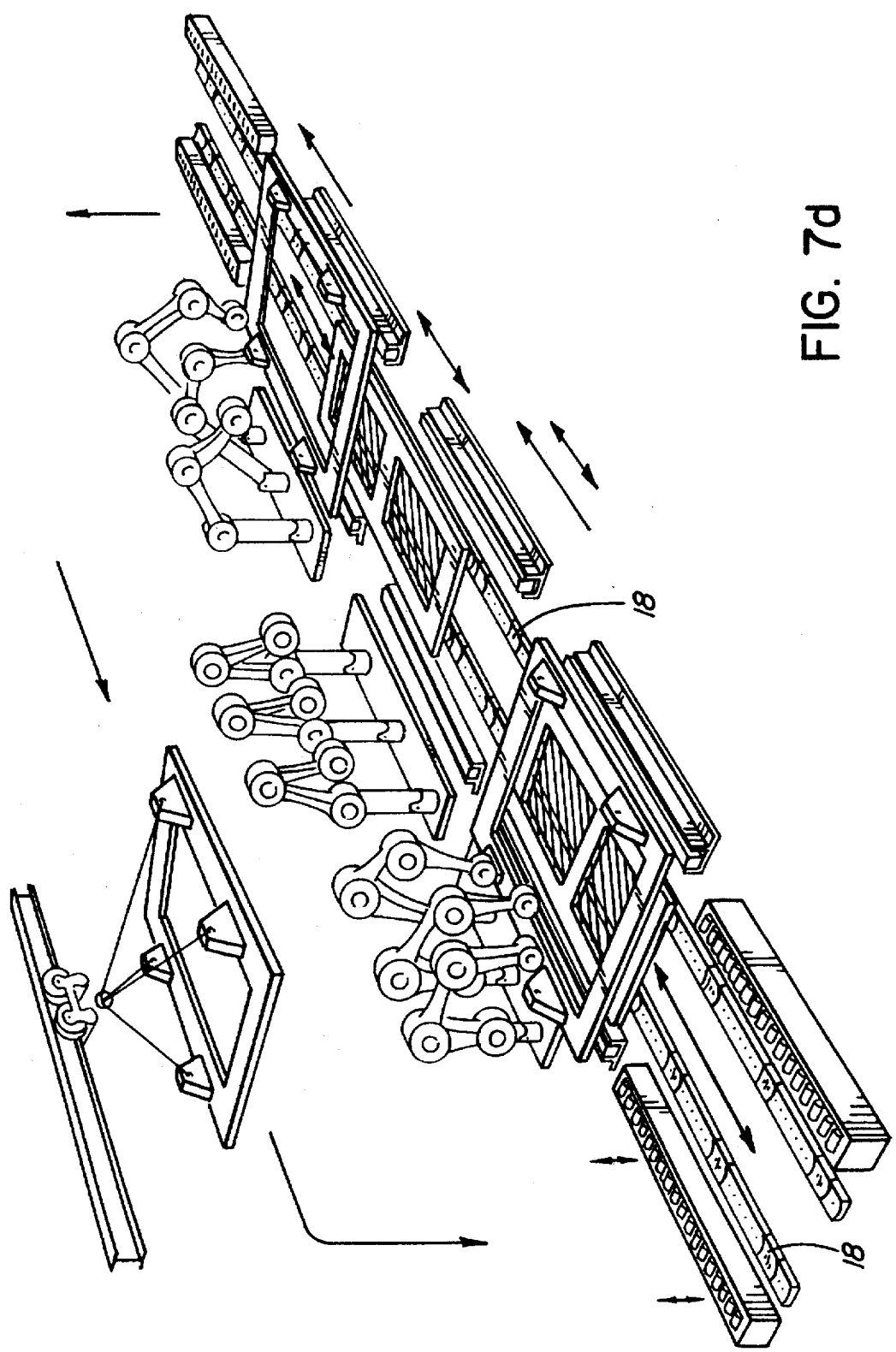
FIG. 7*d* is a perspective view of an automated assembly line showing an actual proposal for automotive assembly and skid handling using pressurized air-gap passive linear motors. These could be replaced by fewer active LIM units according to this invention.

FIG. 7d is a perspective view of another example of an automated line application of a multiple passive LIM 18 driven sled supported assembly line with a return sled system indicated as proposed by an large automotive manufacturer. Here the replacement of the multiple passive LIM 18 rail units with only one active LIM 50 in each sled should be apparent.

Figure 8:
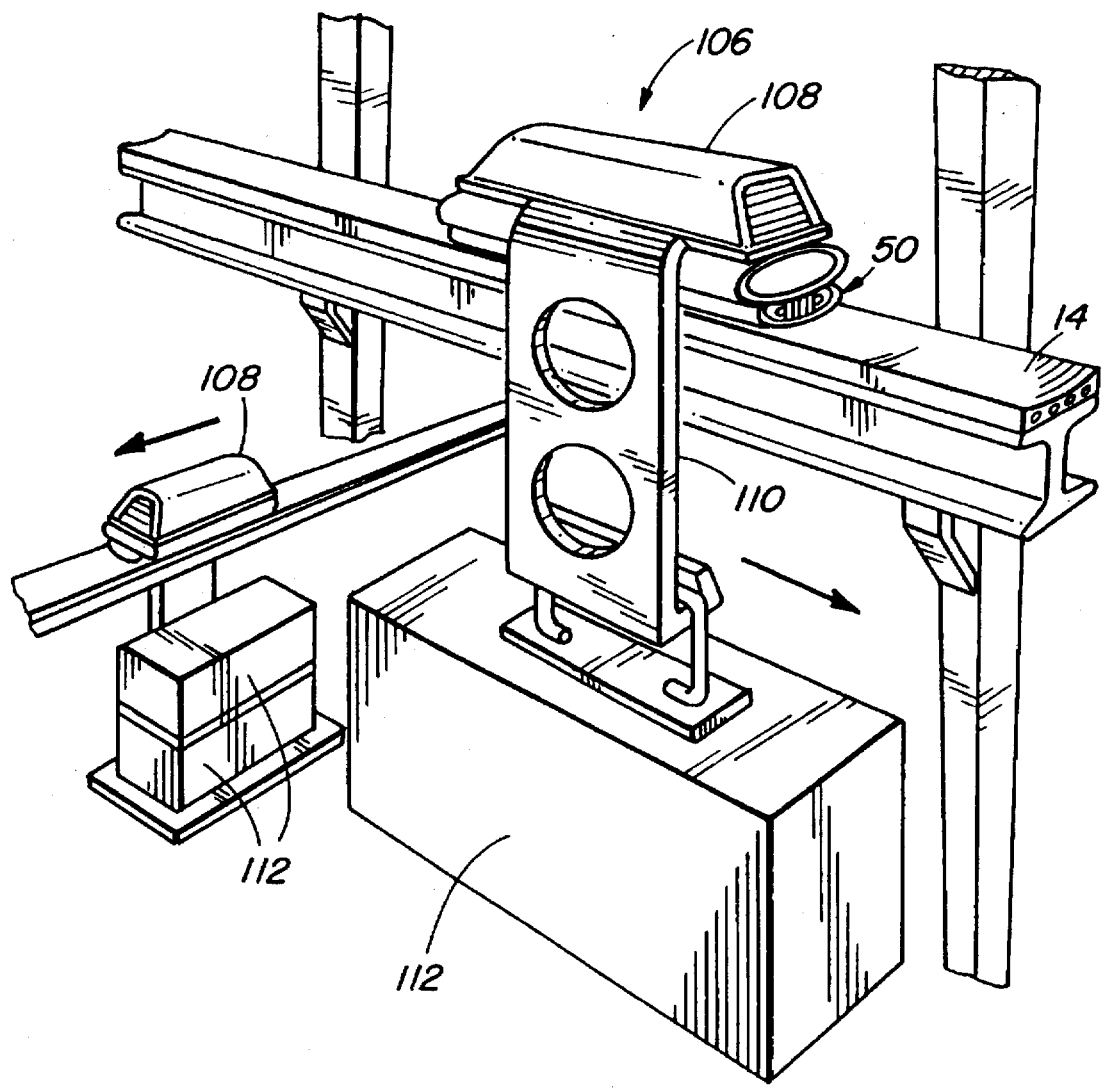
FIG. 8 is a perspective view of an application directly suited to the active pressurized air-gap linear motor propulsion system of the present invention. A single monorail type load handling system is shown as used extensively in large assembly plants such as automotive factories.

FIG. 8 is a perspective view of a further application of in-process load handling in which a monorail adaption 106 of rail 14 supports active self-contained LIM air suspension and thrust units 108 which are analogous to active units 50. The unit 108 carries a hanger 110 which, in turn, supports the load 112. Active LIM units 50 have been described previously in FIGS. 3, 5 and 6 and thus operation in this monorail application is understood. However the self-contained active LIM assembly 108 requires further explanation.

Figure 9:
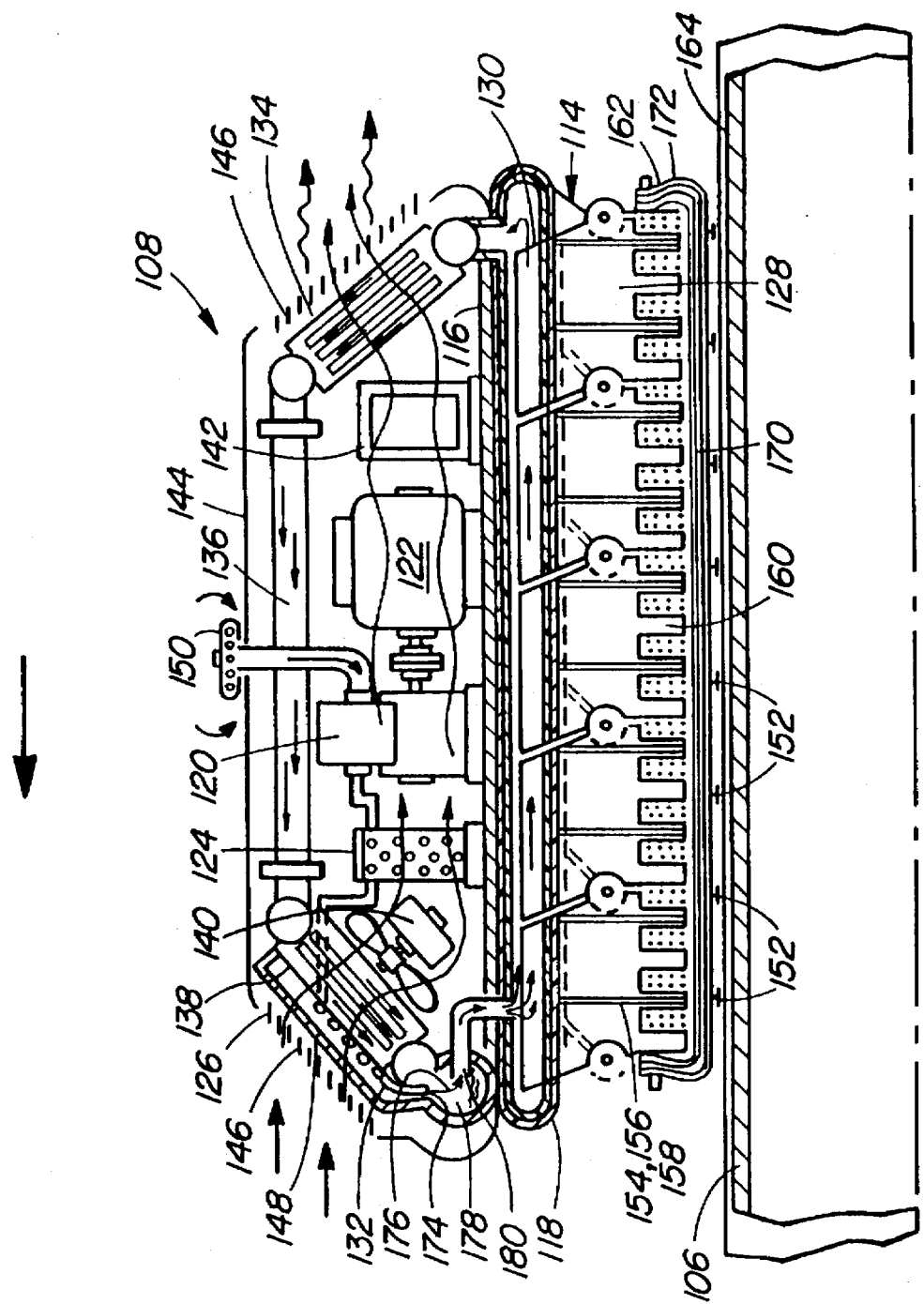
FIG. 9 is a side view of the entirely self-contained active linear motor prime mover showing the arrangement of the flexible primary cores in accordance with the present invention with an air bag mounting which incorporates a compressed air supply for both the air-film nozzles and recirculation cooling.

FIG. 9 is a side section view of an active self-contained LIM air suspension and thrust unit 108 of the present invention. Here LIM core ferromagnetic lamination modules 114 are pivotally interlocked or mechanically linked to allow a limited amount of intermodule vertical flexing. These modules are shown to carry a load platform 116 through the use of a flexible air-bag member 118. This platform 116 serves as the load support means as well as the base plate for ancillary equipment which includes a small air compressor 120, drive motor 122, a high pressure air cooler 124, and additional serpentine cooling tubing 126 mounted in front of a compressed air heat exchanger 138. The LIM core modules 114 are similar to the pivotally assembled hinged modules 72 of compliant pad supported systems previously described in FIG. 5 except that the air-supported modules 114 include spaced apart laminations 128 each of which has a vertical extension 130 protruding as a fin into the air-bag member 18. The air provided by the compressor 120 is circulated through system high pressure air injector 132 into the air-bag member 118 for passage along the LIM core lamination extensions 130 and then subsequently to a first precooling heat exchanger 134. The air flows along passageway or conduit 136 to a second heat exchanger 138 which is equipped with a cooling air fan 140. All of this air equipment and control box 142 (for power conditioning and position response through an encoder pick-up mounted with the collector device and the rail) is contained within a streamlined cowling 144 equipped with louvred fore and aft openings 146 and an air inlet filter 148. An air intake muffler and filter 150 for the small system air compressor 120 supplies relatively cooler external ambient air to the compressor 120 which in turn supplies this air at 90 to 100 psig pressure as make-up air for the system as required to maintain approximately a 40 psig pressure for the air bearing suspension. The make-up air compensates for air lost through leakage and through operation of the nozzles of the air suspension system.

Figure 17:
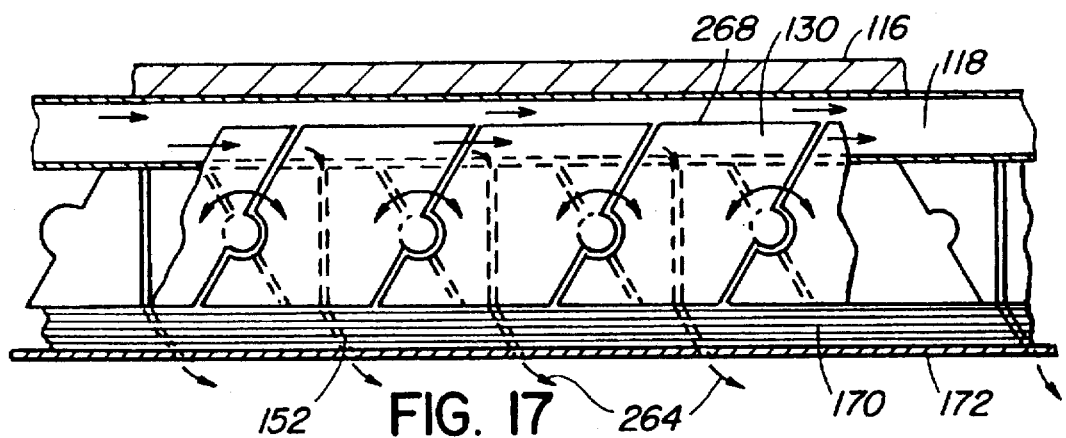
FIG. 17 is a side section showing the support platform with the air bladder spring air flowing over the LIM extension cooling fins with the compliant layer pad and polymer cover and the air jets exiting through the cover into the suspension air-film cavity interface with support surface.
Figure 18:
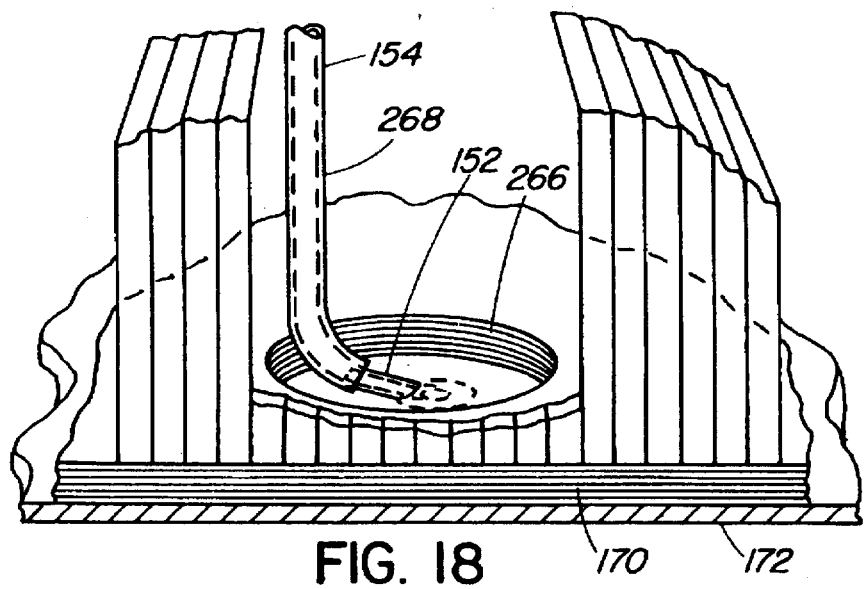
FIG. 18 is a partial perspective view of a single nozzle with compressed air supply flexible tube attached. A clearance cavity is shown around the welded or screwed in place hypodermic or like nozzle.
Figure 19:
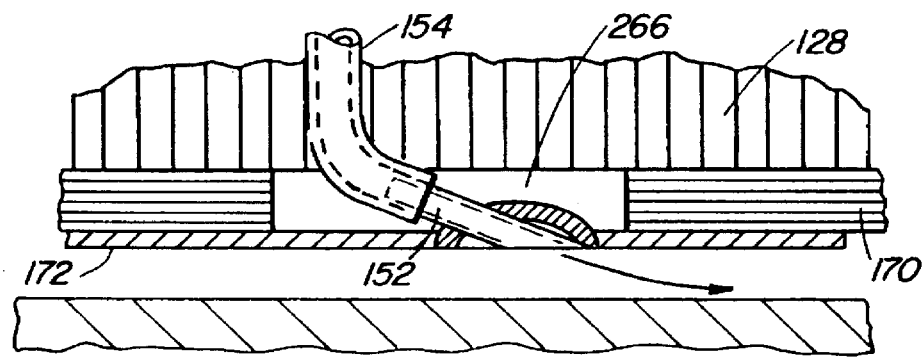
FIG. 19 is a sectional view of a single nozzle cavity showing the nozzle hypodermic welded into the cover and that portion which has been removed by grinding or other process flush with the outside of the cover.

Compressed air required for the relatively few suspension nozzles 152 is fed through individual flexible supply tubes 154, core lamination air passages 156, or holes 158 drilled through the LIM core laminations 160 as shown in FIGS. 17, 18 & 19. The compliant element 162 of the self-contained active LIM runner at the support surface 164 of the concave rail 106 or convex (pipe) rail 166 is similar to that described in FIG. 5 in that a thin continuous compliant pad 170 extends over the working faces of the LIM modules over which a high temperature polymer sheet cover 172 is installed, the nozzles 152 extending through the cover 172.

Injector 132 contains an outside insulated venturi throat 174 for air velocity increase and corresponding pressure reduction according to Bernoulli principles which enhances the general pumping action of recirculation air as produced by the central high velocity jet 176 of the high pressure (100 psig) air supply. At this the already coolest part of the air recirculation system the rapid expansion of the air from the jet 176 to the lower (40 psig) air-bag pressure causes local expansion cooling according to Boyle's principles and the lowering of pressure combined with expansion cooling into a large expansion chamber 178 at this coolest part of the system causes any water contained in the compressed air to condense and drop out of the low velocity air stream in this chamber. A projecting sharp angled (entry) air outlet slot (commonly referred to as a so called "dry pipe" configuration) 180 physically reduces water droplet carry-over. Further water droplet removal can be realized with the addition of small baffles and coalescent filtering media in the expansion chamber. Collected water is drained off from the bottom of the expansion chamber 178 by various automatic means readily known to those skilled in compressed air systems.

FIG. 10 is a cross-sectional view looking from the front of a self-contained air-film suspended active pressurized air-gap LIM propulsion unit 108 supported on a convex pipe system monorail 166. The extensions 130 of the LIM core laminations 128 are easily discernable with the high pressure air jet 176 and expansion chamber 178 and exit slot 182 shown. The monorail ferromagnetic pipe support 166 is shown with electric conductive cladding 184. The load support "C"-shaped carrier or bracket 110 centres the load forces symmetrically on the suspension system while allowing the offset rail supports 186 to be attached to the rail and to a main supporting structure (not shown).

FIG. 10a is a cross-sectional view looking from the front of a self-contained air-film suspended active pressurized air-gap LIM propulsion unit 108 supported on a convex pipe system monorail 166 with a second active pressurized air-gap LIM propulsion unit 109 mounted on an extended "C"-shaped carrier 111 and held to the underside of the convex pipe system monorail by an inverted second air-bag spring member 118 which applies the necessary loading and floating mounting for a second LIM core assembly 192 to the pipe system monorail. As only one module containing ancillary equipment is used to supply both the upper 190 and lower core assemblies 192 of the suspension and propulsion system, an electrical and air recirculation and make-up connection 113 is required to service the lower unit.

Figure 10B:
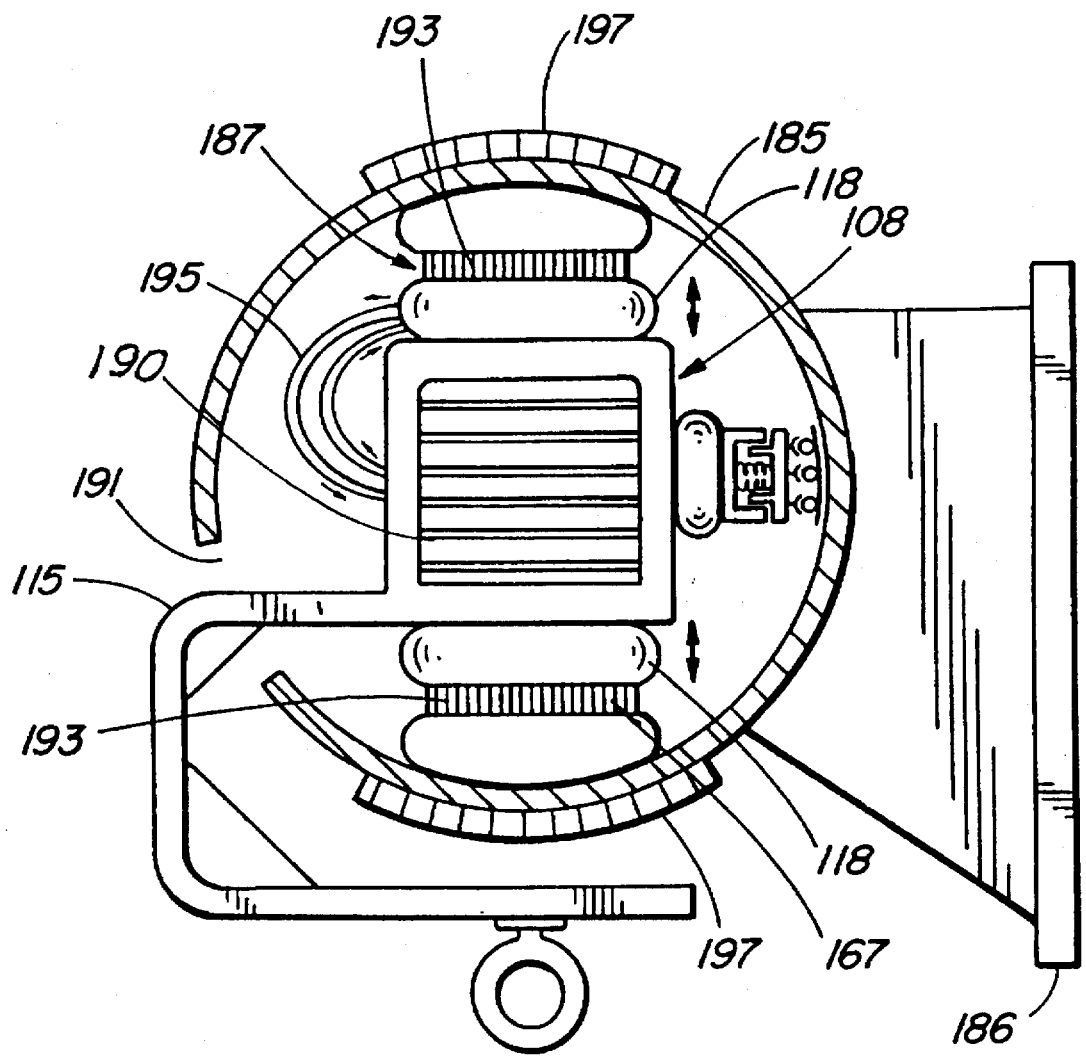
FIG. 10*b* is a cross-sectional view of an active linear motor prime mover showing a monorail assembly with a double, or lower and upper positioning of linear motor units inside a pipe-like guideway and co-acting with the same secondary partial pipe type support. This arrangement in effect doubles the thrust available with the same (one) pressurized air supply. The upper linear motor unit is positioned against the upper inside concave surface of the pipe via a supplementary loading system (in addition to the magnetic attraction usual with this motor) as shown by the use of a flexible bag spring mounting very similar to that of the lower system. Ferromagnetic elements are attached to the outside of the electrically conductive pipe material in positions appropriate for the proper operation of the induced current thrust generation. The continuous slot along the pipe provides only sufficient clearance for the underslung "C"-shaped load support bracket so as to provide the maximum section for structural strength and to also provide maximum protection for the rail surfaces and power collector flexible power pick-up mounting as described previously, located at the backside inside surface.

FIG. 10b is a cross-sectional view looking from the front of a self-contained air-film suspended active pressurized air-gap LIM propulsion unit 108 supported inside an electrically conductive concave partial pipe system monorail 185 with an extended "C"-shaped carrier 115 for central load attachment outside and below the monorail system and with a second active pressurized air-gap LIM propulsion unit unit 187 mounted on top of the propulsion unit 108 and held against the upper inside (underside) of the concave pipe system monorail by a second air-bag spring member 118 as inverted to apply the necessary loading and floating mounting of a second LIM core assembly 193 to the pipe. As only one module 190 containing ancillary equipment is used to supply both the upper and underneath laminations-containing portions 193,167 of the suspension and propulsion system an electrical and air recirculation and make-up connection 195 is required to service the upper unit. The monorail system comprises an electrically conductive pipe of, for example, aluminum of at least 18 inches in diameter, of which a full length longitudinal sector has been removed to define a slot 191 to clear the extended "C"-shaped load carrier system. Necessary ferromagnetic attachments 197 are affixed to the outside convex surface of the pipe monorail at positions and of suitable width as required to co-act with the active LIM units inside the monorail. The mounting bracket 186 is of full depth of the pipe so as to support the monorail on suitable column or wall support structures as well as to hold the pipe circular tolerance, as the pipe tends to open outwards with the section portion removal. The use of the interior of a pipe section as the guideway is of particular advantage in that the support surfaces are almost fully protected from atmospheric contaminants and they offer a saving in the ferromagnetic elements. In addition, the power collector is mounted at the extreme opposite side to the pipe slot and thus is protected to a considerable degree. It can be spring mounted, air-bag mounted, or even air-film suspension mounted (not shown).

Figure 10C:
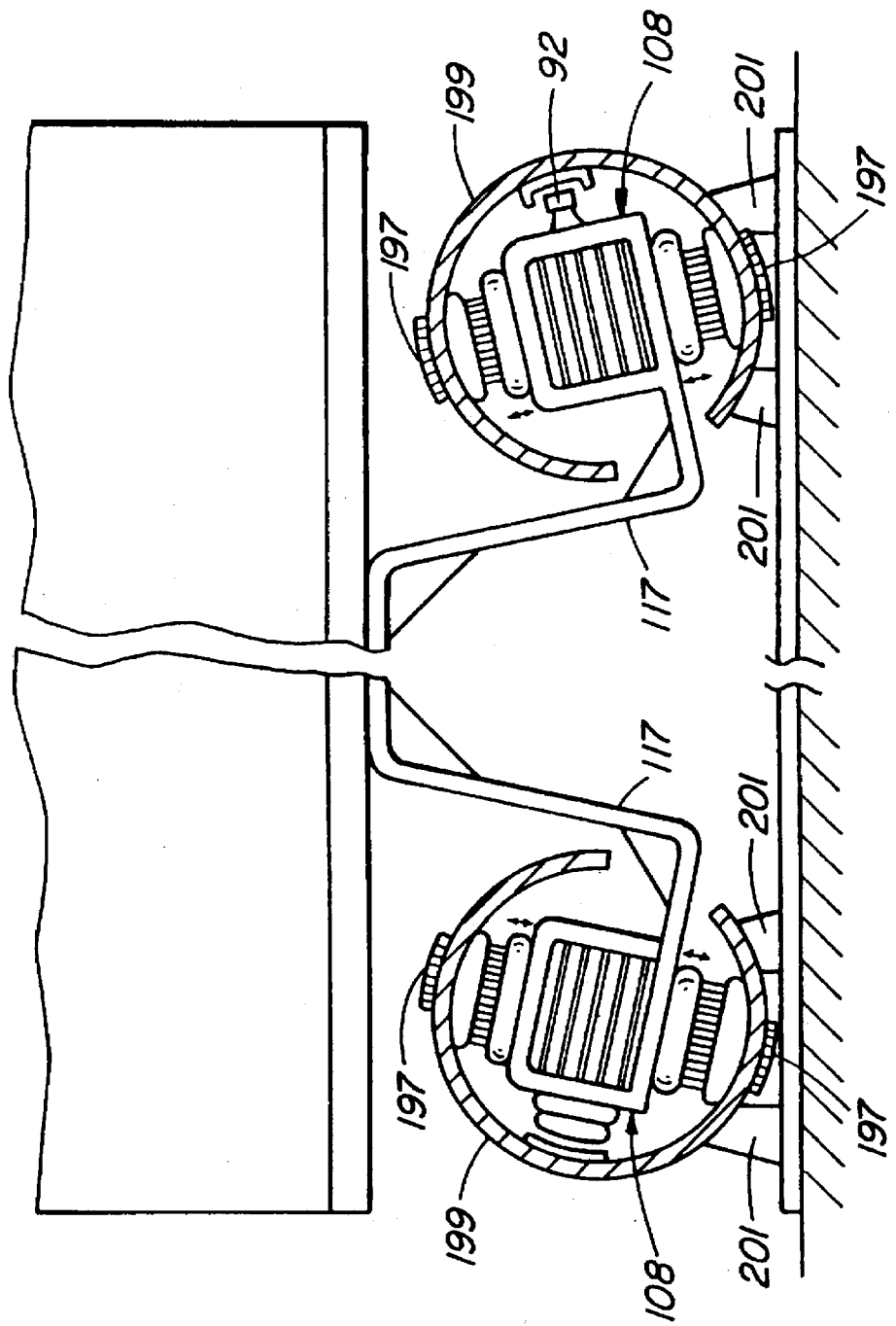
FIG. 10*c* is a cross-sectional view looking from the front of dual self-contained air-film suspended active pressurized air-gap LIM propulsion units supported inside electrically conductive concave partial pipe system monorails arranged in a mirror image type track guideway with an extended carrier for load attachment outside and above. In this example the propulsion units are shown with bracket mountings to allow slightly canted LIM positioning for possible additional stability at high speeds and to show that LIM propulsion units need not always be mounted vertically. Each active LIM propulsion unit has a second LIM propulsion unit mounted on top of the pressurized air supply streamlined canopy and held to the upper inside (underside) of each concave pipe of the track system as described in FIG. 10*b*. The track guideway system comprises parallel electrically conductive pipes of aluminum, also as described previously in FIG. 10*b*. the use of interior pipe section guideway rails is of particular advantages with grade ballasting in that the support surfaces are almost fully protected from atmospheric contaminants and they offer a saving in the ferromagnetic elements. In addition, the power collector shown as an inductive non-contact coil type is mounted at the extreme opposite side to the pipe slot for maximum protection.

FIG. 10c is a cross-sectional view looking from the front of dual self-contained air-film suspended active pressurized air-gap LIM propulsion units 108 supported inside electrically conductive concave partial pipe system monorails 199 arranged in a mirror image type track guideway with an extended carrier 117 for load attachment outside and above. In this example, the propulsion units are shown with bracket mountings 201 to allow slightly canted LIM positioning for possible additional stability at high speeds and to indicate that LIM propulsion units need not always be mounted vertically. Each active pressurized air-gap LIM propulsion unit has a second LIM propulsion unit mounted on top of it and held against the upper inside (underside) of each concave pipe of the track system as described in FIG. 10b. The track guideway system comprises parallel electrically conductive pipes of, for example, aluminum also as described previously. The use of interior pipe section guideway rails is of particular advantage with grade ballasting in that the support surfaces are almost fully protected from atmospheric contaminants and they offer a saving in the ferromagnetic elements. In addition, the power collector, shown as an inductive non-contact coil type 92 is mounted at the extreme opposite side to the pipe slot and is thus well protected.

Figure 11:
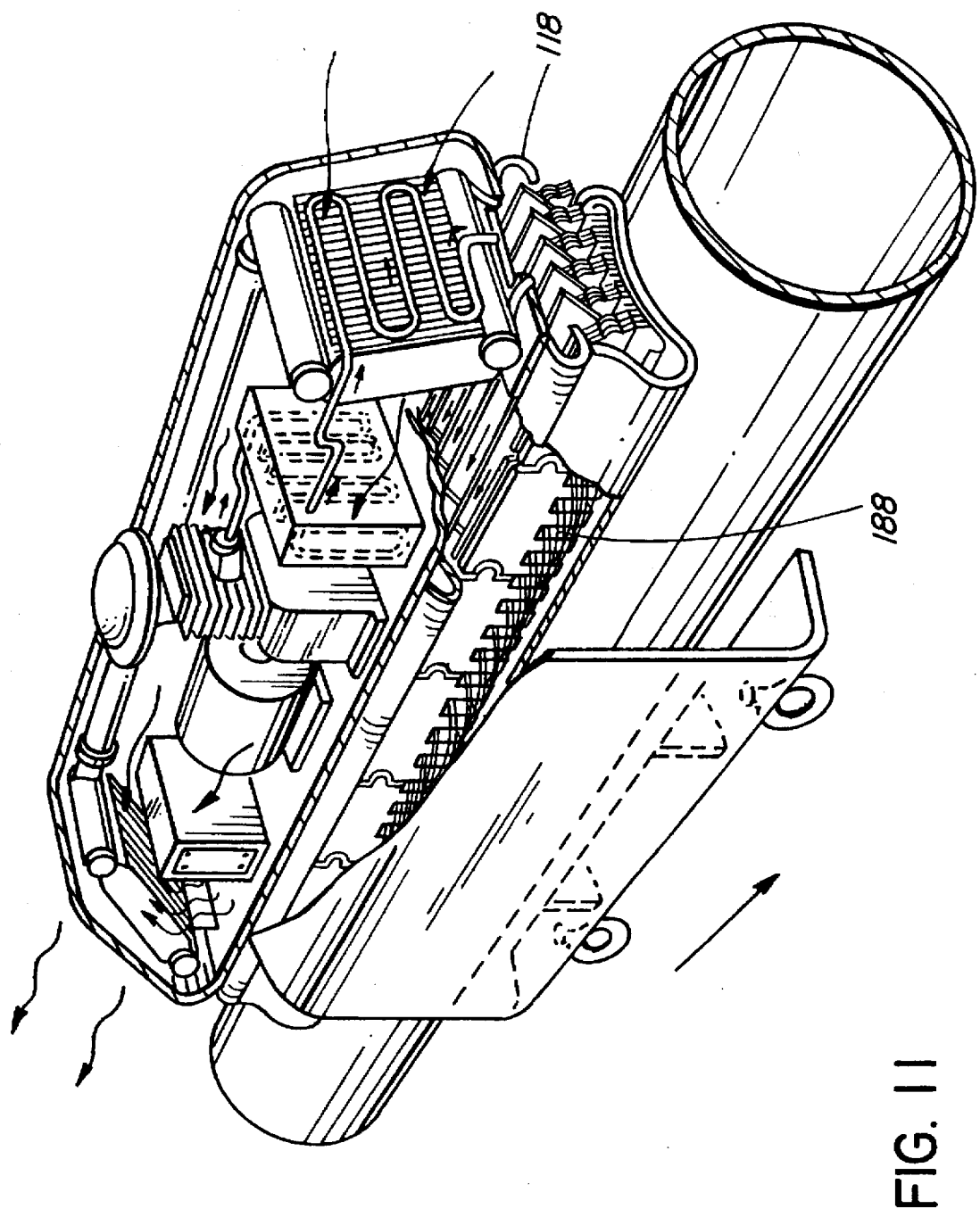
FIG. 11 is a perspective view of a self-contained monorail system showing the linear motor primary core elements and compressed air suspension and recirculation cooling of the interlocking LIM core module laminations with the pivoting protrusion noses and recesses of the laminations and the flexible core winding interconnections which allow limited articulation of each module.

FIG. 11 is a perspective view showing the assembly for further clarification of the present invention air-bag spring member 118 and the need for the LIM core windings 188 to exhibit a degree of flexibility between the LIM core modules.

Figure 12:
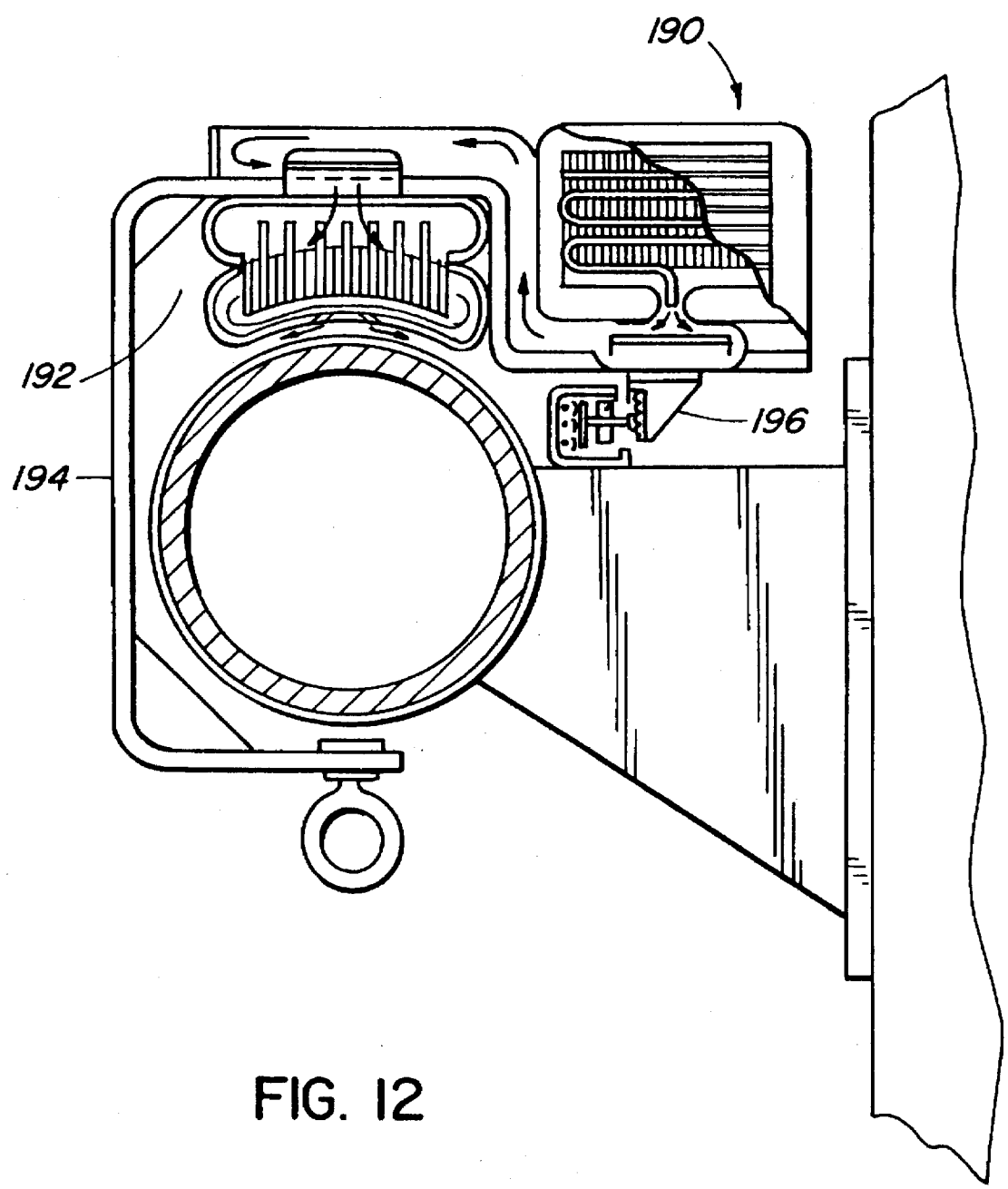
FIG. 12 is a cross-sectional detail of a self-contained monorail active LIM system supported on a pipe rail assembly showing a concave LIM core lamination module with the ancillary compressor and recirculation cooling apparatus all mounted to one side opposite the load connection yoke to effectively counter-balance this yoke and to provide a flexible mounted power collector platform.

FIG. 12 is a sectional view from the front showing an alternative construction wherein ancillary equipment is mounted in a separate module 190 to one side of the laminations-containing portion 192 to act as a counterbalance to the load support 194 as well as to lower the overall height of the assembly. The power collector system is shown as a module 196 mounted separately underneath the air supply and control module 190. A system for allowing limited float linkage for this collector pick-up is indicated.

Figure 13:
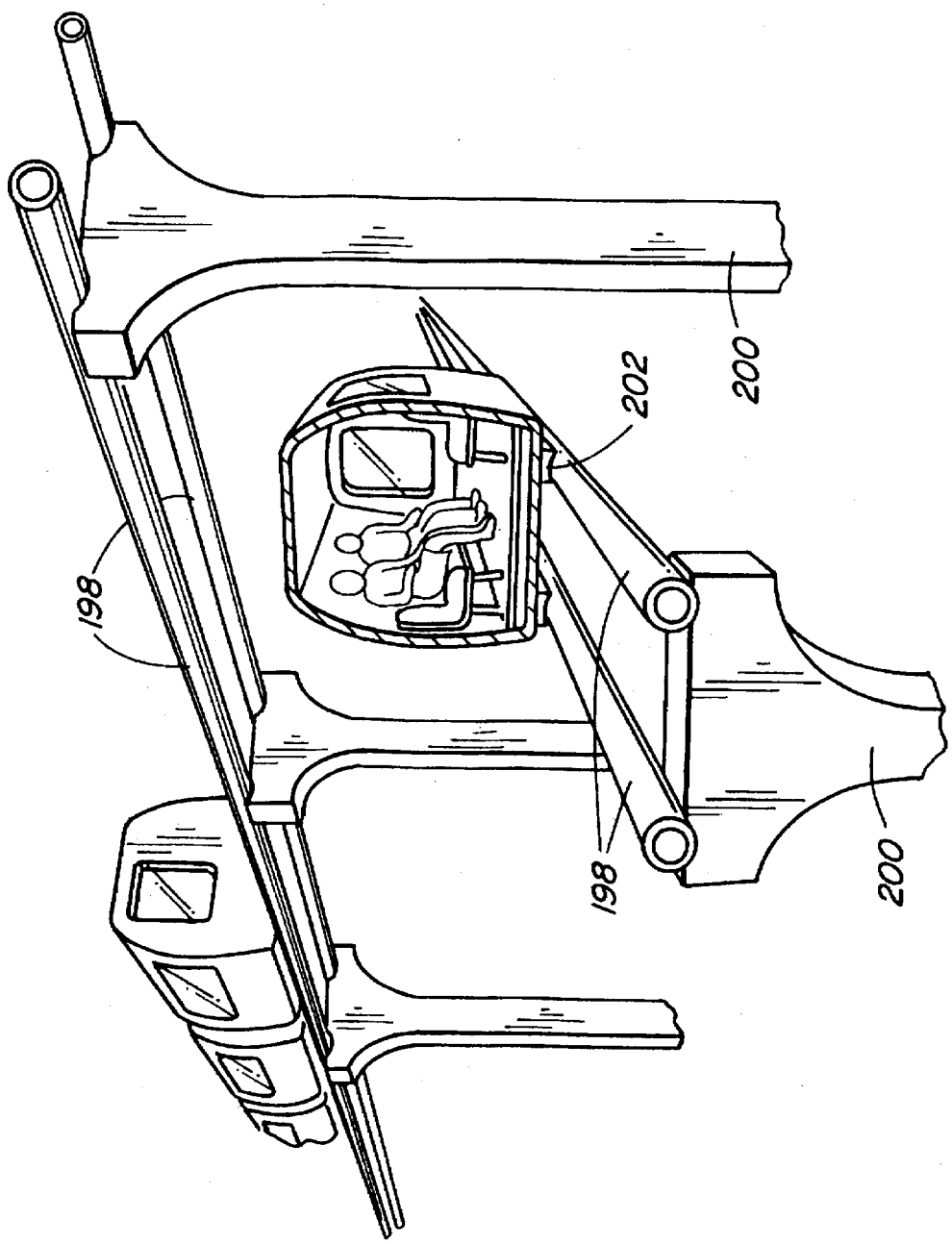
FIG. 13 is an artistic sketch of an elevated pipe tracked people and goods mover transportation system as might be used for rapid transit in an urban setting.

FIG. 13 shows a two pipe track support system 198 with elevated supports 200. In this artistic rendering the active self-contained LIM propulsion units 202 are configured as "people movers" and as can be seen the present invention is clearly not restricted to interior (factory) applications. The present invention is capable of carrying loads of considerable weight.

Figure 14:
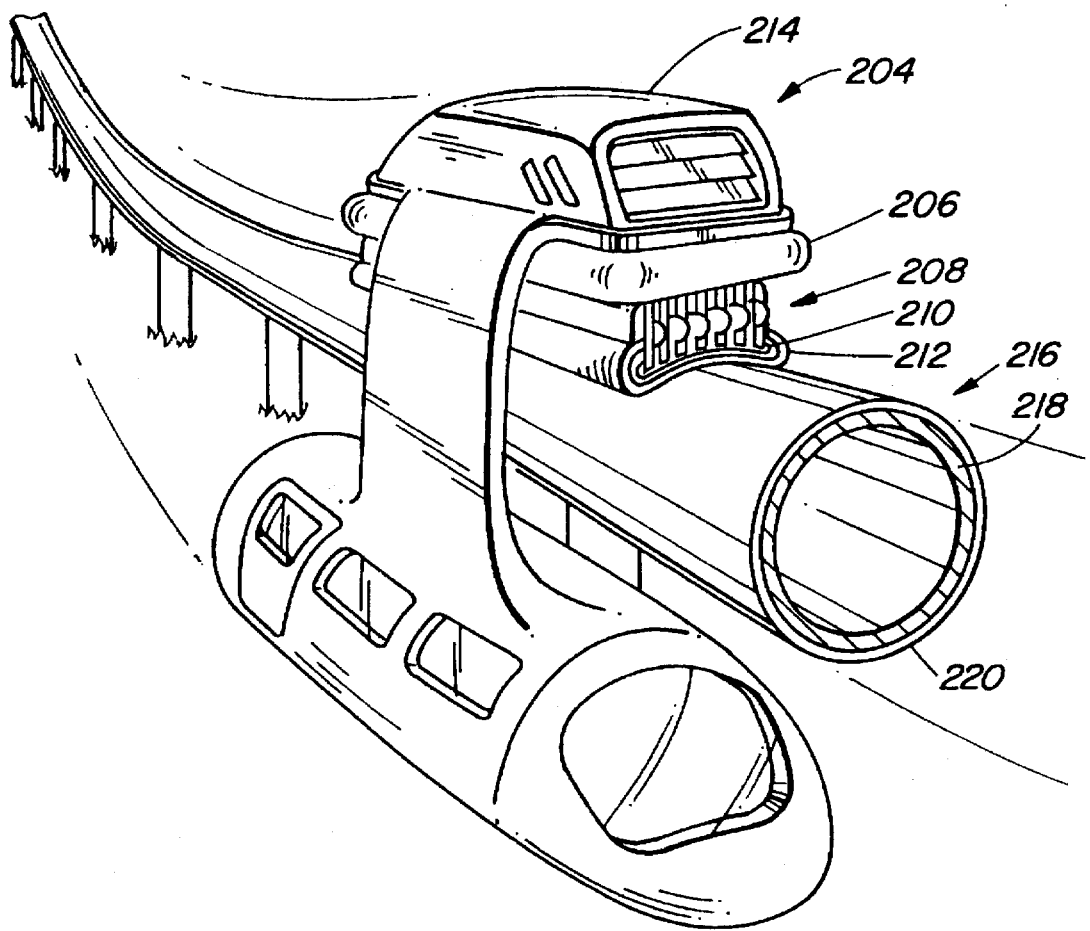
FIG. 14 is an artistic impression of an elevated high speed monorail vehicle module using active self-contained pressurized suspension and air-gap LIM propulsion with power collector or on-board gas turbine power source as might be employed for long distance transportation.

FIG. 14 is an artistic perspective of a monorail-type self-contained pressurized air-gap LIM propulsion system 204. Various components of the system are shown in an exaggerated manner for ease of comprehension. These components include the air-bag spring 206, the flexible LIM module 208 and the compliant pad 210 having a high temperature flexible sheet cover 212. In this embodiment a small gas turbine engine (not shown) is mounted inside the streamlined cowling 214 and is capable of supplying additional thrust if desired. The compressor stage bleed acts as a source for compressed air and drives an on-board electrical alternator. This alternator is used for the energizing the LIM for variable thrust levels and speeds and provides power for a motor and an on-board compressor to effect the necessary extensive cooling of the flexible LIM primary system as operated on a long distance elevated monorail LIM secondary. The secondary in this application is provided by an elevated pipeline 216 having a ferromagnetic core 218 and an electrically conductive aluminum cladding 220.

Figure 15:
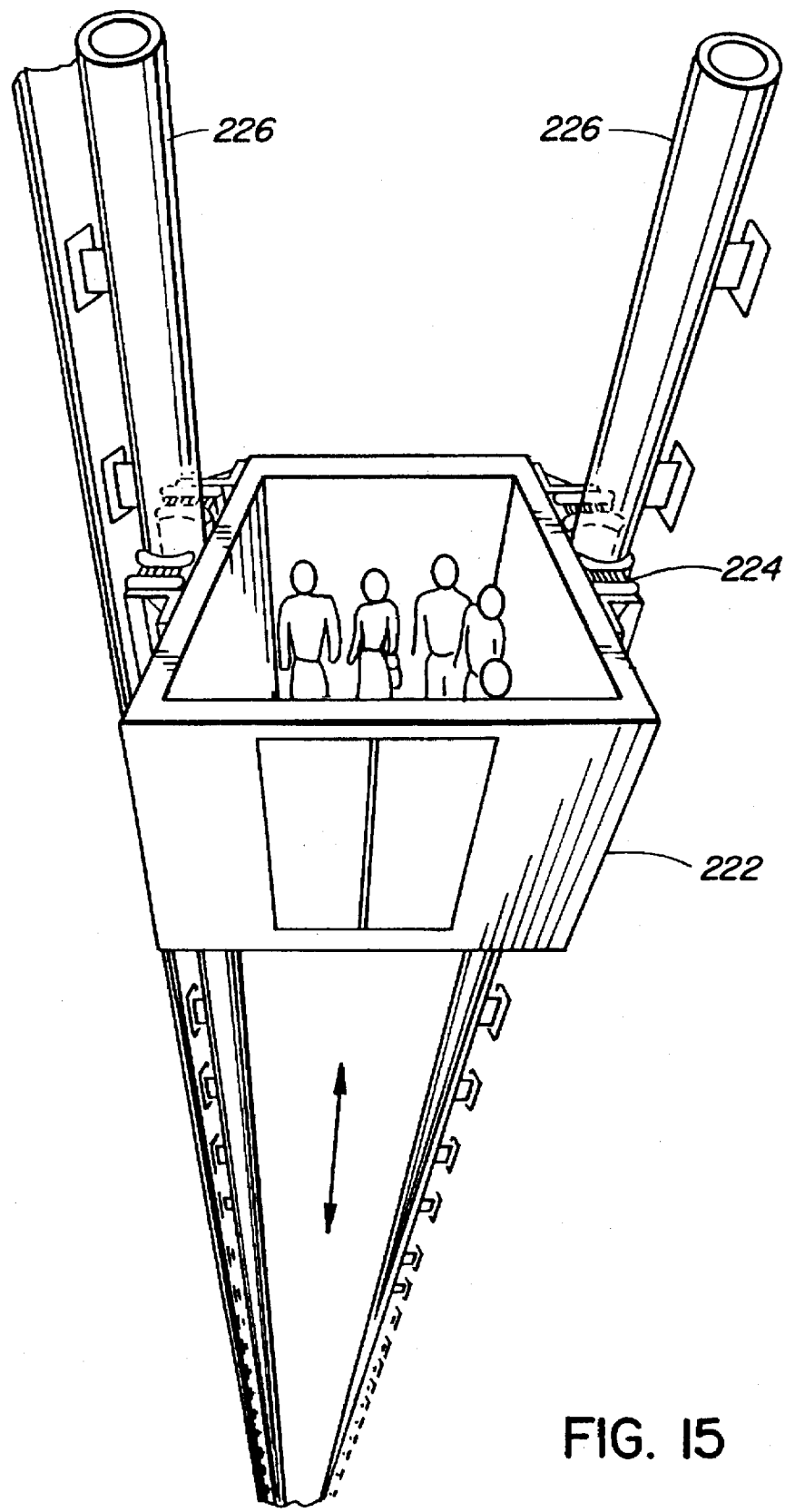
FIG. 15 is an artistic impression of an application of the active type linear motor propulsion as embodied in an elevator operation in which there are no cables.

FIG. 15 illustrates an artistic rendering of another application for the pressurized air-gap active LIM drive of this invention. In this case the application is an elevator system 222 in which air-bag mounted LIM units 224 operate on both sides of vertical pipe secondary elements 226 as shown or on a single central pipe secondary (not shown) to completely eliminate the need for heavy weights and speed limiting cables and headshaft drives, although a simple counterweight system may be employed if desired. The elevator cage is preferably streamlined in order to compensate for the high vertical speeds achievable.

Figure 16A:
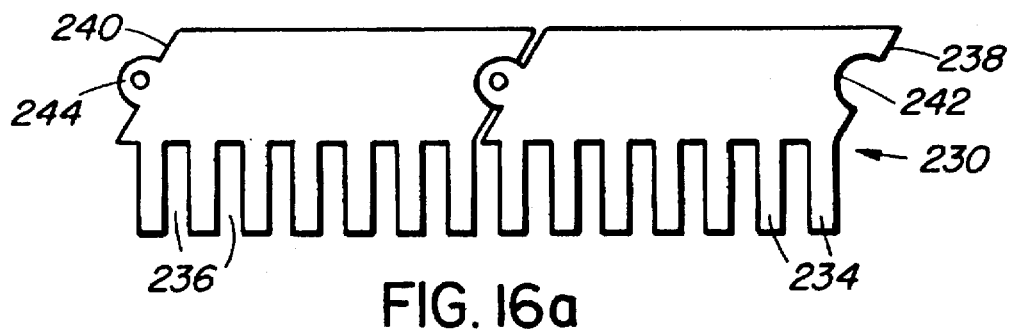
FIGS. 16a–16d are drawings of the active LIM core lamination plate profiles which when assembled provide a curved face module while allowing a small degree of individual module flexing with complete overlapping for continuity of the magnetic flux flow and extension firming for heat dissipation to atmosphere of pressurized fluid coolant.

FIGS. 16a–16d are detail drawings of the LIM lamination core plates used in this invention. Two types of core plates 230 and 232 are shown, both being formed of a ferromagnetic material of about 1.3 mm in thickness and being provided with longitudinally alternating generally rectangular teeth 234 and slots 236, the electrical windings being directed through the slots of the assembled plate modules as depicted earlier. In FIG. 16a the plates 230 are shown with the teeth 234 and slots 236 located along the lower portion thereof and with the upper portion having angled forward and rearward edges 238 and 240 respectively. The angled forward edge 238 has a generally semi-circular recess 242 formed therein while the angled rearward edge 240 has a generally semi-circular protrusion 244 formed thereon, each protrusion 244 being adapted for rotatable engagement with a corresponding recess 242 of a longitudinally adjacent plate 230. The fit between the protrusion 244 and the recess 242 is fairly tight, while limited clearance between adjacent angled edges 238 and 240 allows for a limited degree of vertically rotational movement between longitudinally connected plates 230.

Figure 16B:
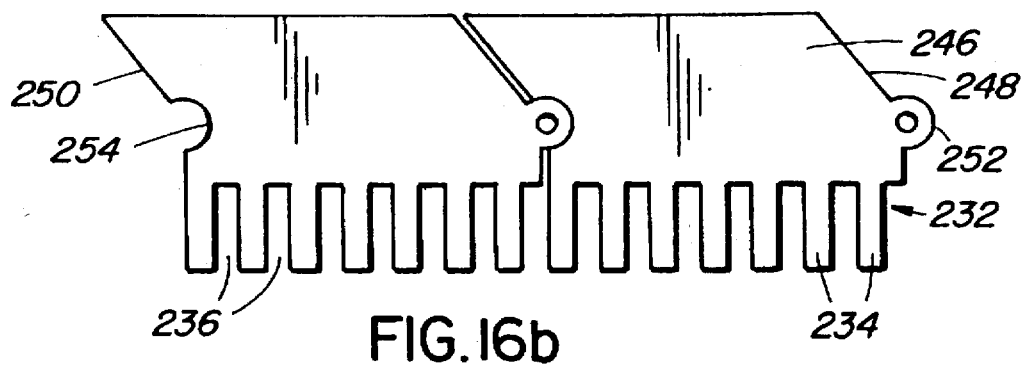
Figure 16C:
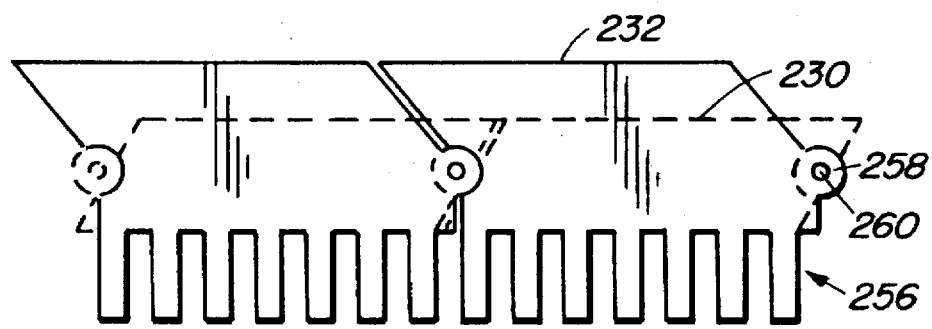

FIG. 16b shows the other plates 232, which plates have rectangular teeth and slots 234 and 236, respectively, identical to those of the plates 230. The plates 232, however, are provided with vertical extensions 246 which form the fin extensions 130 mentioned above with respect to FIG. 9. The forward and rearward edges 248 and 250 of the plates 232 slope oppositely to the forward and rearward edges of the plates 230 and with these plates the forward edge 248 is provided with a semi-circular protrusion 252 while the rearward edge 250 is provided with a semi-circular recess 254, the protrusions 252 and the recesses 254 serving the same purpose as the protrusions 244 and the recesses 242 of the plates 230. The first-described plates 230 are shown in dotted lines in FIG. 16c in relation to the plates 232.

Figure 16D:
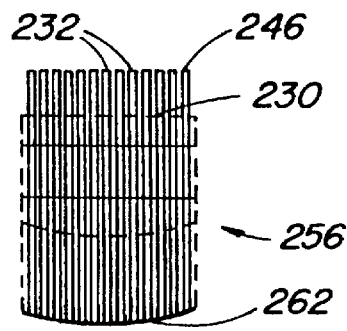

As seen in FIG. 16d the plates 232 are spaced apart so as to alternate laterally with the plates 230 across the width of a module 256, with the extensions 246 projecting upwardly so that they can reside within the confines of an air-bag in the overall assembly and thus be subjected to cooling air passing thereover as previously described. While every second plate is shown as having an extension 246 it is understood that more than one standard plate 230 could be positioned between spaced apart extended plates 232. The teeth and slots of adjacent laterally adjacent plates are aligned so that a plurality of slots extending the full width of a module are created, which slots receive the electrical windings as taught in U.S. Pat. No. 5,128,569. The windings that bridge the intermodule gaps should not be wound overly tightly so that the desired limited undulating movement of the modules relative to each other is not hindered. That undulating movement is available through the interengaging and alternating protrusion-in-recess pivotal connections provided at each end of the modules. If desired, the protrusions 244 and 252 can be provided with alignable central apertures 258 which in turn receive a hinge-pin 260 to connect (a) the laterally adjacent plates of one module together and (b) to pivotally connect each module to a longitudinally adjacent module.

As seen best in FIG. 16d the bottom surface of the teeth 262 defined by laterally adjacent plate teeth 234 are machined to have a convex profile, which profile is complementary to the concave trough or upper surface 20 of a rail 14 (for example). If the lamination module is to be used in a LIM primary that will be used on a convex rail (for example a pipeline-type monorail as in FIG. 14) the bottom profile of the module teeth 262 would be concave, rather than convex.

FIG. 17 is a side view section showing the support platform 116 with the air passing along the interior of the air-bag spring 118 flowing over the lamination extension cooling fins 130. The compliant layer pad 170 is shown, along with the polymer cover 172 and the air jets 264 exiting through the nozzles 152 provided in the cover 172 into the suspension air-film cavity interface with the appropriate rail support surface.

FIG. 18 is an enlarged partial perspective view of a single nozzle 152 with a flexible compressed air supply tube 154 attached thereto. A clearance cavity 266 is shown as surrounding the welded or screwed in place hypodermic or like nozzle 152. the flexible tube 154 is seen as passing downwardly from the interior of the air-bag 118 through a hole or gap 268 provided between an adjacent pair of laminations within a module.

FIG. 19 is an enlarged sectional view of a single nozzle cavity 266 showing the hypodermic or like nozzle 152 welded into the cover 172 and that portion of the nozzle which extended beyond the outer surface of the cover having been removed as by grinding or otherwise so that the nozzle is flush with the outer surface of the cover 172. Flexible tubing 154 as fed through the LIM module laminations 128 is attached to the nozzle 152 in such a manner so as to allow a degree of localized cover movement. The clearance pocket or cavity 266 of not more than an inch diameter is cut in the compliant pad 170 around the nozzle 152 to allow for additional localized flexing or vibration.

The foregoing has described an active LIM propulsion and suspension system which has numerous advantages and applications. It is understood that a competent engineer could readily devise alternative structures and applications without departing from the spirit of the present invention. Accordingly the protection to be afforded this invention is to be determined from the claims amended hereto.

I claim:

1. An active linear induction motor (LIM) propulsion system comprising: a passive secondary in the form of at least one elongated rail member having transversely arcuate operating surface means; an active primary member for interaction with the rail member; and means for providing pressurized fluid between said rail operating surface means and said primary member to support said primary member above said operating surface means and to maintain a magnetic air gap between said primary member and said operating surface means; wherein:

(a) said rail member includes electrically conductive and ferromagnetic means in close proximity to said operating surface means over the length thereof;

(b) said primary member includes: a plurality of laterally adjacent, longitudinally extending and articulated ferromagnetic laminations, said laminations having a longitudinally toothed surface that is transversely arcuate to be complementary to said rail operating surface means; electrical windings wound about selected groups of teeth of said laminations as a LIM primary; compliant means adjacent said laminations, capable of deformation under load and at least partial recovery after load removal; power means for obtaining electrical power continuously as said primary moves along said rail and supplying polyphase electrical current to the electrical windings; and cooling means contained in said primary member for continuously providing cooling fluid to said laminations during operation of the primary member; and (c) said means for providing pressurized fluid is adapted to inject pressurized fluid at high velocity into the space between said rail operating surface means and said compliant means, to support said primary member above said operating surface means and to provide a minute pressurized magnetic and suspension gap between the primary and secondary members for efficient linear motor operation.

2. The system of claim 1 wherein said rail member is cylindrical in cross-section, said operating surface means is convex, said electrically conductive means is carried on said operating surface means, and said means for supplying pressurized fluid is contained in said primary member.

3. The system of claim 1 wherein said rail member has a transversely concave operating surface means, said ferromagnetic means is provided within said rail member, a plurality of small diameter nozzles extend from the interior of said rail member to the exterior thereof, exiting at said operating surface means, and said means for providing pressurized fluid supplies the pressurized fluid to flow through selected nozzles to the operating surface means when said primary member is in the vicinity of such selected nozzles.

4. A core for a primary of an active linear induction motor comprising: a plurality of longitudinally adjacent modules; each of said modules including a plurality of juxtaposed longitudinally extending ferromagnetic plates, each of said plates including a plurality of rectangular teeth extending along a longitudinal edge thereof with adjacent teeth being separated by a rectangular slot, said plates being positioned relative to each other to define a plurality of longitudinally spaced core teeth composed of laterally adjacent plate teeth, each core tooth having a transversely arcuate operating surface complementary to a rail supporting and guiding surface; means at each end of each module for interengaging longitudinally adjacent modules to permit limited rotational articulation of one module relative to the adjacent module or modules; and electrical windings wound around selected groups of said core teeth of the interengaged modules to create a plurality of separate, longitudinally adjacent core poles, the windings of every third pole being electrically connected together to define three individual sets of such poles over the length of said core.

5. The core of claim 4 wherein selected ones of the ferromagnetic plates of each module have a portion thereof extending upwardly of the others of the juxtaposed ferromagnetic plates within the module, opposite to said core teeth, said extending portions serving to help dissipate heat generated during operation of said primary.

6. The core of claim 5 wherein each plate of each module has a generally semicircular protrusion extending from the forward or the rearward edge thereof and a generally semicircular recess extending into the rearward or the forward edge thereof respectively, each protrusion of a plate of one module being adapted for rotational reception in the recess of a longitudinally aligned plate of an adjacent module.

7. The core of claim 6 wherein the forward edges of laterally adjacent plates of each module are provided alternately with a recess and a protrusion respectively.

8. The core of claim 7 including tension means extending around the interengaged and wound modules to maintain said modules in interengagement while permitting said limited intermodule articulation.

9. The core of claim 7 wherein said wound modules, but not the protrusions and recesses thereof, are encapsulated in a moderately flexible protective material.

10. The core of claim 9 wherein said material is an epoxy having a high index of thermal conductivity.

11. The core of claim 6, including a compliant layer extending along the operating surface of said core, said compliant layer comprising a filler including a length of multilayered cellulosic material and a resilient yet flexible cover encasing the filler over the length thereof.

12. A runner serving as a primary for a fluid bearing linear induction motor (LIM) propulsion system wherein a secondary for the system is in the form of an elongated rail having a transversely convex operating surface such that the runner can be supported and guided by the secondary on a thin layer of pressurized fluid, said runner comprising: an elongated housing; electrical motor means within said housing; a plurality of longitudinally adjacent LIM operating modules adjacent said housing, each module including a plurality of longitudinally extending laterally adjacent core plates defining a transversely concave surface complementary to said rail operating surface, said modules being interengaged for limited relative rotational articulation; electrical wiring suitably wound about the plates of said modules for a LIM primary; compliant support means attached to said complementary concave surface of said modules; flexible bag means sealingly supporting said housing on said modules, said modules being exposed to the interior of said bag means; means connecting said motor means and said wiring to electrical power means carried by or adjacent said rail whereby electrical power can be continuously provided to said motor means and to said electrical wiring; fluid compression means within said housing, driven by said motor means for providing pressurized fluid; heat exchange means within said housing for cooling the fluid used to extract heat from said operating modules of said primary; means for continuously circulating heat extraction fluid from the interior of said bag means to said heat exchange means and back to said bag means to cool said modules exposed to the interior thereof; and means for feeding pressurized fluid produced by said fluid compression means to an operating surface of said compliant means to provide said thin layer of pressurized fluid which acts as a fluid bearing in cooperation with said rail operating surface for supporting and guiding said runner on said rail and for maintaining a minimum magnetic gap between said runner and said rail for proper LIM operation.

13. The runner of claim 12 wherein: each of said core plates includes a plurality of lengthwise alternating rectangular teeth and slots, said plates being juxtaposed to define a plurality of longitudinally spaced core teeth composed of laterally adjacent plate teeth, each core tooth having a transversely concave profile complementary to the rail operating surface; means are provided at each end of each plate for interengaging longitudinally adjacent plates to permit limited rotational articulation of one module relative to the adjacent module or modules; and said electrical wiring is wound around selected numbers of said core teeth of the interengaged modules to create a plurality of separate, longitudinally adjacent core poles, the windings of every third pole being electrically connected together to define three individual sets of such poles over the length of said runner.

14. The runner of claim 13 wherein selected ones of the ferromagnetic plates of each module have a portion thereof extending proud of the others of the juxtaposed plates into the interior of the bag means, said extending portions offering increased exposure to said heat extraction fluid in the interior of said bag means and serving to further dissipate heat generated during operation of said primary.

15. The runner of claim 14 wherein each plate of each module has a generally semicircular protrusion extending from the forward or the rearward edge thereof and a generally semicircular recess extending into the rearward or the forward edge thereof respectively, each protrusion of a plate of one module being adapted for pivotal reception in the recess of a longitudinally aligned plate of an adjacent module.

16. The runner of claim 15 wherein the forward edges of laterally adjacent plates of each module are provided alternately with a recess and a protrusion respectively.

17. The runner of claim 16 including tension means extending around the interengaged and wound modules to maintain said modules in interengagement while permitting said limited intermodule articulation.

18. The runner of claim 16 wherein said wound modules, but not said protrusion and recesses, are separately encapsulated in a moderately flexible protective material.

19. The runner of claim 18 wherein said material is an epoxy having a high index of thermal conductivity.

20. The runner of claim 12 wherein said compliant support layer comprises a filler including a length of multilayered cellulosic material and a resilient yet flexible cover encasing the filler over the length thereof.

21. The runner of claim 12 wherein said housing includes louvre means at each end thereof, forward and rearward radiator means within the housing adjacent the louvre means, first conduit means connected to said fluid compression means and passing in front of said forward radiator means, second conduit means interconnecting said radiator means, and venturi means at an exit from said forward radiator means, whereby relatively hot fluid is circulated from the interior of said bag means through said rearward radiator means, along said second conduit means and through said forward radiator means, is cooled at both said radiator means, and is mixed with, and further cooled by, compressed fluid from said first conduit means at said venturi means, the cooled fluid flowing into said bag means and then flowing over the extended portions of said modules to cool said modules.

22. The runner of claim 21 wherein said fluid is air and including means for introducing make-up air to said compression means from the atmosphere.

23. A conveying system for conveying a load between two points comprising: a linear motor propulsion system as defined by claim 2; means for supporting the load from said primary member; and means extending along and adjacent to said rail member for supplying electrical power to said power means on said primary member; wherein said rail member extends continuously between said points, said supporting means includes means for suspending the load below said rail member, and said power means includes electrical pick-up means extending between said primary member and said electrical power supplying means.

24. A conveying system for conveying a load between two points comprising: a linear motor propulsion system as defined by claim 3; means for supporting the load by said primary member; and means extending along and adjacent to said rail member for supplying electrical power to said power means on said primary member; wherein said rail member extends continuously between said points, said supporting means includes deck means for supporting the load above said rail member, and said power means includes electrical pick-up means extending between said primary member and said electrical power supplying means.

25. A conveying system for conveying a load between two points comprising: a linear motor system as defined by claim 2; a first said primary member; a second, inverted said primary member connected to said first primary member and loaded against a second operating surface means of said rail opposite the first-defined operating surface means thereof; means extending along said rail member for supplying electrical power to said power means on one of said primary members; means carried by said primary members for supporting the load; and means interconnecting said primary members for shared power, pressurized fluid and fluid recirculation provision; wherein said rail member extends continuously between said points, and said power means includes electrical pick-up means extending between said one of said primary members and said electrical power supplying means.

26. A conveying system as defined by claim 25 wherein said rail member is circular in cross-section, said first-mentioned operating surface means is an upper external arcuate surface portion of said rail member, said first primary member is positioned adjacent said upper surface portion, said second operating surface means is a lower external arcuate surface portion of said rail member, and said second primary member is positioned adjacent said lower surface portion.

27. A conveying system as defined by claim 25 wherein said rail member is generally C-shaped in cross-section, having an arcuate internal surface and a slot extending longitudinally along one side of the rail member, said first-mentioned operating surface means is an upper internal arcuate surface portion of said rail member, said first primary member is positioned adjacent said upper surface portion, said second operating surface means is a lower internal arcuate surface portion, said second primary member is positioned adjacent said lower surface portion, said load supporting means extends externally of said rail member through said slot, and said electrical power supplying means is positioned adjacent said rail member internal surface opposite said slot.

28. A conveying system as defined by claim 27 including a pair of mirror image said C-shaped rail members laterally spaced apart and canted towards each other with the slots thereof facing each other, said load supporting means of each pair of primary members being connected together between the rail members to support a load thereon.

29. A conveying system for conveying a load between two points comprising: a linear motor propulsion system as defined by claim 3; a second rail member having a transversely concave upper surface extending parallel to said first-defined rail member; a runner member for air bearing support and guiding on said second runner member; means for providing pressurized fluid to said second rail member for communication thereof to the upper surface of said second rail member; deck means extending between said primary member and said runner member for supporting a load thereon; and means extending along and adjacent to said first-defined rail member for supplying electrical power to said power means on said primary member; wherein said rail members extend continuously between said points, and said power means includes electrical pick-up means extending between said primary member and said electrical power supplying means.

30. An elevator system comprising: a container member in which people and/or goods are to be moved generally vertically and a linear motor propulsion system as defined by claim 2 symmetrically arranged relative to said container member for moving said container member generally vertically, each primary member of said propulsion systems being secured to said container member and the rail members of said propulsion systems extending parallel and between vertically spaced apart levels.

31. A rail section serving as a secondary for an active linear motor propulsion system wherein a primary for the system is included in a member to be supported and guided by the rail section, said section comprising: a hollow elongated member of an electrically conductive non-ferromagnetic material having a transversely concave operating surface; at least one internal passageway extending the length of said rail section for receiving pressurized fluid, said passageway communicating with the atmosphere by way of a plurality of longitudinally spaced small diameter nozzles extending through said rail section to open at said operating surface; and a plurality of ferromagnetic elements contained within said passageway in close proximity to said operating surface, said nozzles extending through or past said ferromagnetic elements.

* * * * *